US012170069B2

(12) United States Patent
Hasu et al.

(10) Patent No.: US 12,170,069 B2
(45) Date of Patent: Dec. 17, 2024

(54) DISPLAY SYSTEM AND CIRCUIT DEVICE HAVING LOCAL DIMMING CONTROL OF BACKLIGHT

(71) Applicant: SEIKO EPSON CORPORATION, Tokyo (JP)

(72) Inventors: Tatsuhiro Hasu, Matsumoto (JP); Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/349,679

(22) Filed: Jul. 10, 2023

(65) Prior Publication Data

US 2024/0013738 A1 Jan. 11, 2024

(30) Foreign Application Priority Data

Jul. 11, 2022 (JP) ................................ 2022-111036

(51) Int. Cl.
*G09G 3/34* (2006.01)

(52) U.S. Cl.
CPC ....... *G09G 3/3426* (2013.01); *G09G 2310/08* (2013.01); *G09G 2320/0242* (2013.01); *G09G 2320/0247* (2013.01); *G09G 2320/064* (2013.01)

(58) Field of Classification Search
CPC ....... G09G 3/2007; G09G 3/2014–204; G09G 3/34–3406; G09G 3/342; G09G 3/3426; G09G 2300/026; G09G 2310/0237; G09G 2310/04; G09G 2310/06; G09G 2310/08; G09G 2320/0242; G09G 2320/0247;
(Continued)

(56) References Cited

U.S. PATENT DOCUMENTS

2010/0045710 A1 2/2010 Choi et al.
2011/0249033 A1* 10/2011 Oh ...................... G09G 3/3426 345/690

(Continued)

FOREIGN PATENT DOCUMENTS

CN 116137752 A * 5/2023 .......... G09G 3/2007
JP 2008-198430 A 8/2008

(Continued)

OTHER PUBLICATIONS

English translation of CN-116137752-A (Year: 2023).*

*Primary Examiner* — Nathan Danielsen
(74) *Attorney, Agent, or Firm* — Harness, Dickey & Pierce, P.L.C.

(57) ABSTRACT

A display system includes a circuit device and a first light source driver to an n-th light source driver. The circuit device performs local dimming control on a display device including a display panel and a backlight. The first light source driver to the n-th light source driver drive the backlight based on dimming information of the local dimming control. An i-th light source driver PWM-drives an i-th light source element group among the first light source element group to the n-th light source element group provided in a target area based on dimming information for the target area. The target area is an area to be driven by the first light source driver to the n-th light source driver among a plurality of areas of the backlight in the local dimming control.

14 Claims, 19 Drawing Sheets

(58) Field of Classification Search
CPC ...... G09G 2320/0626; G09G 2320/064–0653; G09G 2320/0686
See application file for complete search history.

(56) References Cited

U.S. PATENT DOCUMENTS

| | | | | |
|---|---|---|---|---|
| 2012/0044277 | A1* | 2/2012 | Adachi | G09G 3/3426 345/102 |
| 2012/0207205 | A1* | 8/2012 | Zhao | G09G 3/3406 375/238 |
| 2017/0090225 | A1 | 3/2017 | Asahi et al. | |
| 2020/0051484 | A1 | 2/2020 | Yashiki | |
| 2021/0343253 | A1 | 11/2021 | Goto et al. | |

FOREIGN PATENT DOCUMENTS

| | | | |
|---|---|---|---|
| JP | 2013-222515 | A | 10/2013 |
| JP | 2018-045140 | A | 3/2018 |
| JP | 2020-027273 | A | 2/2020 |
| WO | 2015-186171 | A1 | 12/2015 |
| WO | 2020-049949 | A1 | 3/2020 |

* cited by examiner

DISPLAY SYSTEM AND CIRCUIT DEVICE HAVING LOCAL DIMMING CONTROL OF BACKLIGHT

The present application is based on, and claims priority from JP Application Serial Number 2022-111036, filed Jul. 11, 2022, the disclosure of which is hereby incorporated by reference herein in its entirety.

BACKGROUND

1. Technical Field

The present disclosure relates to a display system, a circuit device, and the like.

2. Related Art

WO 2015/186171 describes a liquid crystal display device in which flicker of a backlight is reduced. The backlight includes a light guide plate and a plurality of light emitting diodes arranged in a row adjacent to one side of the light guide plate. The plurality of light emitting diodes are divided into n backlight blocks which are turned on at different timings. The n backlight blocks are turned on in an order different from a physical arrangement order of the backlight blocks. Accordingly, flicker is reduced even in a low-luminance region with a duty ratio of less than 25%.

WO 2015/186171 described above is a technique related to global dimming that causes an entire backlight to emit light with uniform brightness. WO 2015/186171 does not describe a technique for achieving both a countermeasure against flicker of the backlight and local dimming in which the backlight emits light with independent brightness for each area.

SUMMARY

An aspect of the present disclosure relates to a display system including: a circuit device configured to perform local dimming control on a display device including a display panel and a backlight; and a first light source driver to an n-th light source driver configured to drive the backlight based on dimming information of the local dimming control, n being an integer of 2 or more. An i-th light source driver among the first light source driver to the n-th light source driver PWM-drives an i-th light source element group among a first light source element group to an n-th light source element group provided in a target area based on the dimming information for the target area, i being an integer of 1 or more and n or less, and the target area being an area to be driven by the first light source driver to the n-th light source driver among a plurality of areas of the backlight in the local dimming control.

Another aspect of the present disclosure relates to a display system including: a circuit device configured to perform local dimming control on a display device including a display panel and a backlight; and a first light source driver to an n-th light source driver configured to drive the backlight based on dimming information of the local dimming control, n being an integer of 2 or more. An i-th light source driver among the first light source driver to the n-th light source driver PWM-drives a first light source element group to a k-th light source element group provided in a target area at different timings based on the dimming information for the target area, i being an integer of 1 or more and n or less, k being an integer of 2 or more, and the target area being an area to be driven by the i-th light source driver among a plurality of areas of the backlight in the local dimming control.

Still another aspect of the present disclosure relates to a circuit device for performing local dimming control on a display device including a display panel and a backlight. The circuit device includes: an image processing circuit configured to output display data to be displayed on the display panel; and a backlight control circuit configured to control a first light source driver to an n-th light source driver that drive the backlight, n being an integer of 2 or more. The backlight control circuit controls an i-th light source driver among the first light source driver to the n-th light source driver to PWM-drive an i-th light source element group among a first light source element group to an n-th light source element group provided in a target area based on dimming information of the local dimming control for the target area, i being an integer of 1 or more and n or less, and the target area being an area to be driven by the first light source driver to the n-th light source driver among a plurality of areas of the backlight in the local dimming control.

Yet still another aspect of the present disclosure relates to a circuit device for performing local dimming control on a display device including a display panel and a backlight. The circuit device includes: an image processing circuit configured to output display data to be displayed on the display panel; and a backlight control circuit configured to control a first light source driver to an n-th light source driver that drive the backlight, n being an integer of 2 or more. The backlight control circuit controls an i-th light source driver among the first light source driver to the n-th light source driver to PWM-drive a first light source element group to a k-th light source element group provided in a target area at different timings based on dimming information of the local dimming control for the target area, i being an integer of 1 or more and n or less, k being an integer of 2 or more, and the target area being an area to be driven by the i-th light source driver among a plurality of areas of the backlight in the local dimming control.

DESCRIPTION OF EXEMPLARY EMBODIMENTS

Hereinafter, preferred embodiments of the present disclosure will be described in detail. The present embodiment to be described below does not unduly limit contents described in the claims, and not all configurations described in the present embodiment are necessarily essential constituent elements.

1. Regarding Backlight Flicker

First, an example in which backlight flicker may be visible will be described with reference to FIGS. 1 to 4. Thereafter, a configuration example of the present embodiment will be described.

Figure 1:
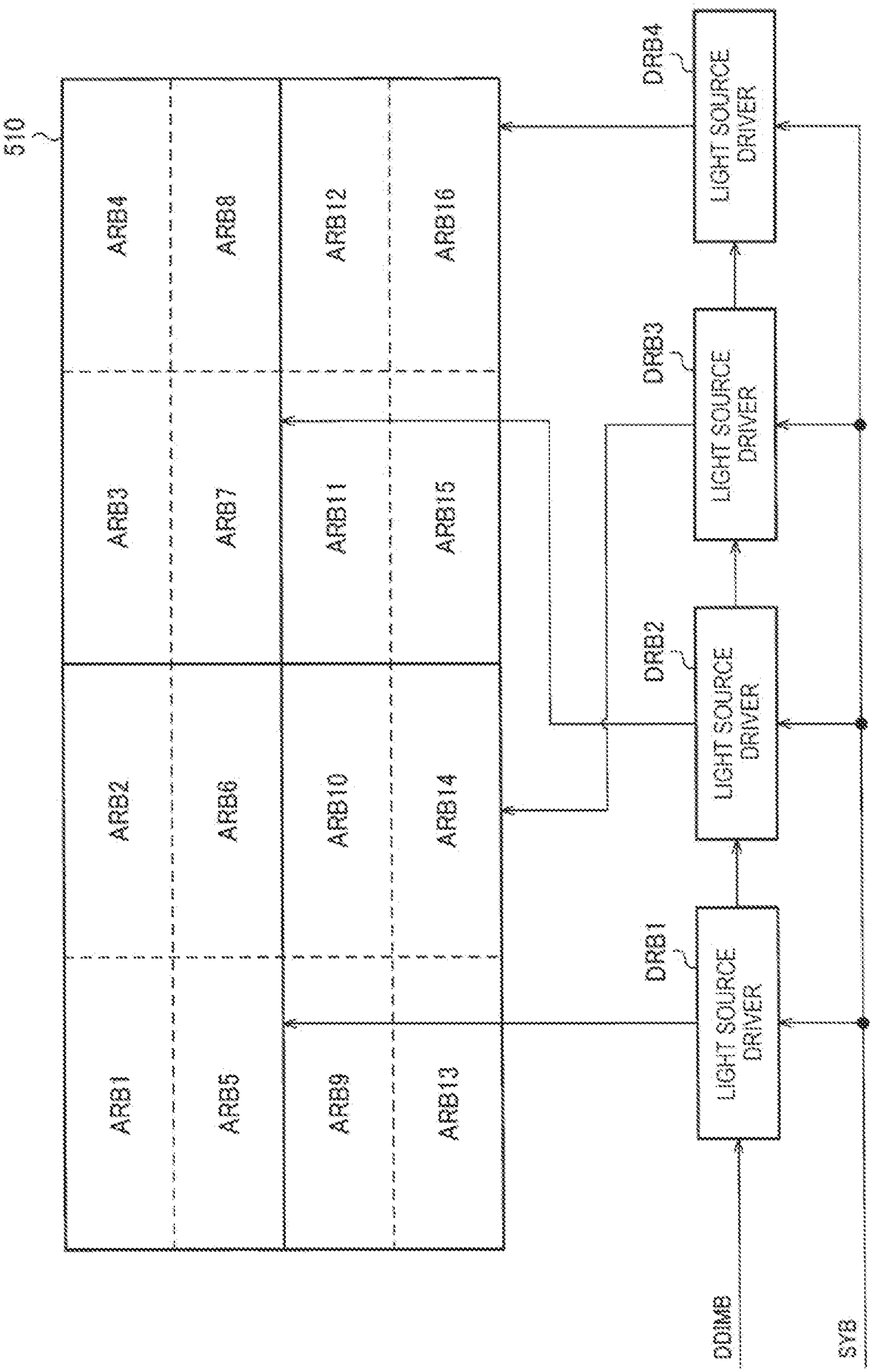
FIG. 1 is a diagram showing an example in which backlight flicker may be visible.

FIG. 1 is a diagram showing an area division of a backlight. A display panel is disposed to overlap a backlight 510 in plan view with respect to the backlight 510, but the display panel is not shown in FIG. 1.

In the plan view with respect to the backlight 510, light source elements are two-dimensionally arranged in the backlight 510. In the plan view with respect to the backlight 510, the backlight 510 is divided into areas ARB1 to ARB16, and a plurality of light source elements are arranged in each area.

Each area is a dimming unit for local dimming. That is, the plurality of light source elements arranged in one area are controlled to emit light with the same luminance. The light source elements arranged in different areas are controlled to emit light with mutually independent luminance.

Dimming data DDIMB indicating dimming information of local dimming control is input to light source drivers DRB1 to DRB4. The dimming information is information indicating with what luminance each light source element is caused to emit light. For example, the light source drivers DRB1 to DRB4 are coupled for cascade communication, and each light source driver acquires dimming data related to a light source element driven by itself from the dimming data DDIMB transmitted through the cascade communication. Alternatively, the light source drivers DRB1 to DRB4 may be coupled in parallel to a communication bus, and each light source driver may acquire the dimming data related to the light source element driven by itself from the dimming data DDIMB transmitted through the communication bus.

A common synchronization signal SYB is input to the light source drivers DRB1 to DRB4. Each light source driver performs scan driving to drive while scanning the two-dimensionally arranged light source elements, and the synchronization signal SYB is a signal for controlling a timing of the scan driving.

The light source drivers DRB1 to DRB4 drive the light source elements in different areas. FIG. 1 shows an example in which each light source driver drives four areas. Specifically, the light source driver DRB1 drives the areas ARB1, ARB2, ARB5, and ARB6, the light source driver DRB2 drives the areas ARB3, ARB4, ARB7, and ARB8, the light source driver DRB3 drives the areas ARB9, ARB10, ARB13, and ARB14, and the light source driver DRB4 drives the areas ARB11, ARB12, ARB15, and ARB16.

Figure 2:
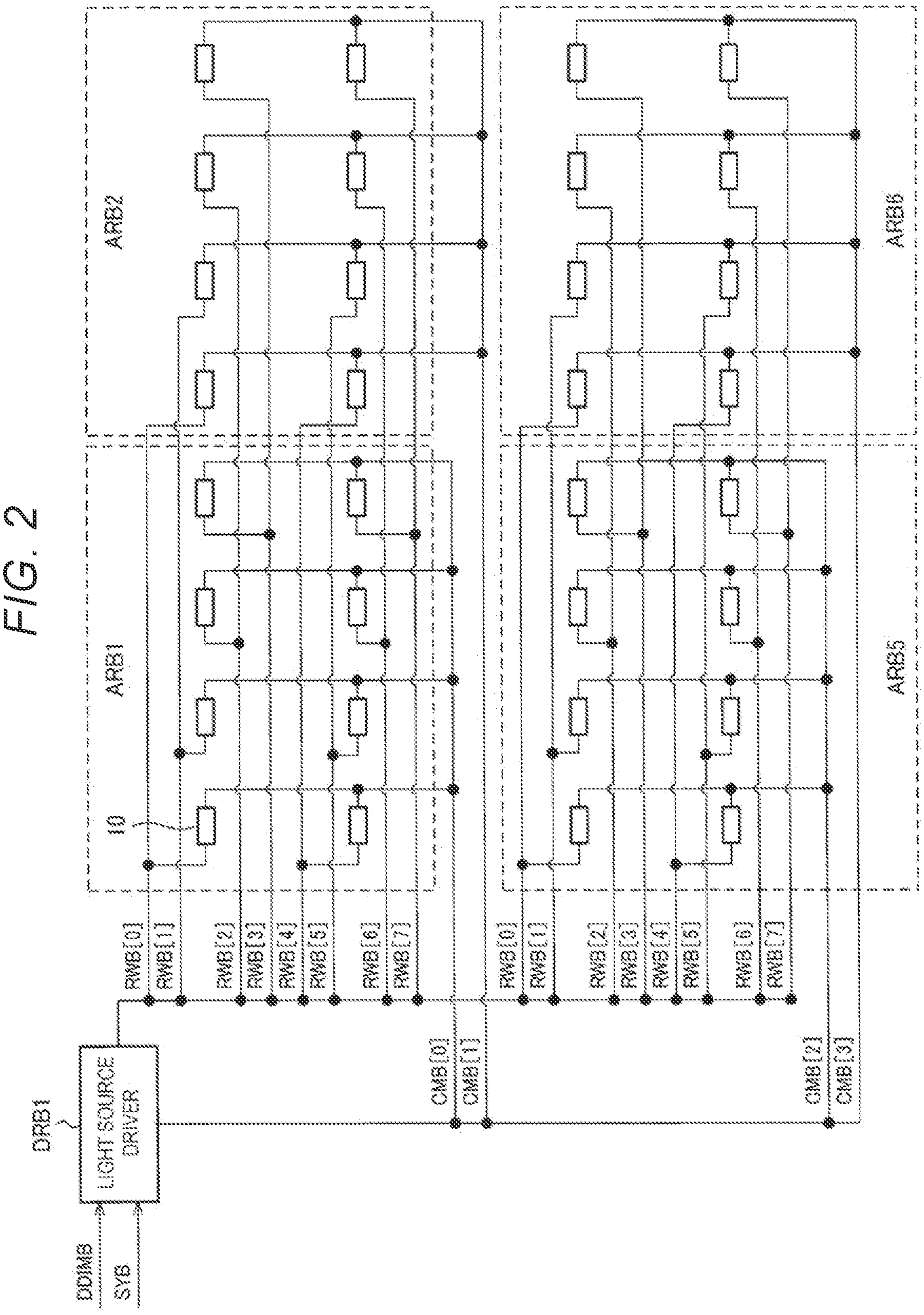
FIG. 2 is a diagram showing an example in which the backlight flicker may be visible.

FIG. 2 shows an example of a connection between the light source driver and the light source element. Here, an example of a connection between the light source driver DRB1 and light source elements 10 in the areas ARB1, ARB2, ARB5, and ARB6 is shown, and the same connection is applied to other light source drivers. Here, an example in which 2×4 light source elements are arranged in a matrix in each area is shown, but a plurality of light source elements may be arranged in each area.

The light source driver DRB1 outputs a column signal CMB [0] to a first column line. Similarly, the light source driver DRB1 outputs column signals CMB [1], CMB [2], and CMB [3] to a second column line, a third column line, and a fourth column line, respectively. A column signal CMB [3:0] is a signal for selecting the light source element 10 to emit light.

The 2×4 light source elements 10 arranged in the area ARB1 are coupled to the first column line. Similarly, the 2×4 light source elements 10 arranged in respective areas ARB2, ARB3, and ARB4 are coupled to the second column line, the third column line, and the fourth column line, respectively.

The light source driver DRB1 outputs a row signal RWB [0] to a first row line. Similarly, the light source driver DRB1 outputs row signals RWB [1], RWB [2], RWB [3], RWB [4], RWB [5], RWB [6], and RWB [7] to a second row line, a third row line, a fourth row line, a fifth row line, a sixth row line, a seventh row line, and an eighth row line, respectively. A row signal RWB [7:0] is a PWM signal for driving the light source element 10 selected by the column signal, and the light source element 10 to which a PWM signal is applied emits light with a luminance corresponding to a pulse width of the PWM signal.

The light source elements 10 in a first row and a first column of each area are coupled to the first row line. Similarly, the light source elements 10 in a first row and a second column, a first row and a third column, a first row and a fourth column, a second row and a first column, a second row and a second column, a second row and a third column, and a second row and a fourth column of respective areas are coupled to the second row line, the third row line, the fourth row line, the fifth row line, the sixth row line, the seventh row line, and the eighth row line, respectively.

Figure 3:
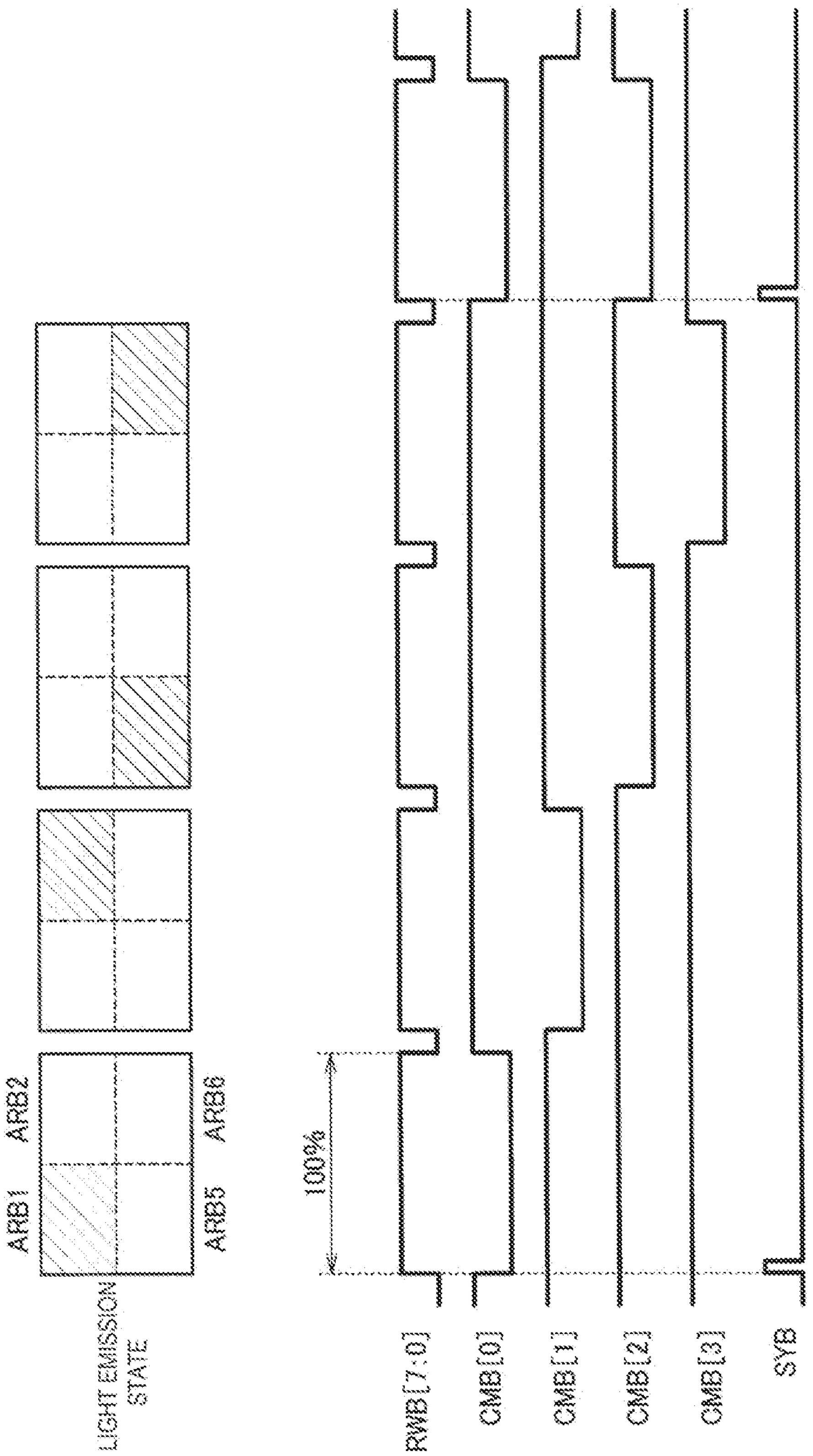
FIG. 3 is a diagram showing an example in which the backlight flicker may be visible.

FIG. 3 shows an example of a signal waveform and an example of a light emission state in a connection state in FIG. 2. Here, an example in which the light source elements emit light with a luminance of 100% is shown, but the luminance of the light source elements in each area may be optional. Here, the light source driver DRB1 is described as an example, and other light source drivers have similar waveforms and light emission states.

The synchronization signal SYB is a signal synchronized with a vertical synchronization signal for image display, and is a pulse signal of one pulse in one vertical scanning period. Between the pulses, the light source driver DRB1 outputs the PWM signal with four periods as the row signal RWB [7:0]. The light source driver DRB1 sets the column signal CMB [0] to a low level in a first period of the PWM signal. Similarly, the light source driver DRB1 sets the column signals CMB [1], CMB [2], and CMB [3] to a low level in a second period, a third period, and a fourth period of the PWM signal, respectively.

The light source element 10 is selected when a low-level column signal is input, and emits light with a luminance corresponding to the pulse width of the PWM signal during the selected period. That is, in one period of the synchronization signal SYB, the light source elements 10 selected by the column signals CMB [0], CMB [1], CMB [2], and CMB [3] sequentially emit light. In the connection example in FIG. 2, since the 2×4 light source elements in one area are selected by one column signal, the areas ARB1, ARB2, ARB5, and ARB6 emit light in this order as shown in an upper part of FIG. 3.

In FIG. 3, each area emits light only in a ¼ period of one vertical scanning period, and is turned off in a remaining ¾ period. For example, when a frequency of vertical synchronization is 160 Hz, a frequency of the PWM signal is 640 Hz. Focusing on one area, light is emitted at 640 Hz/4=160 Hz. As the frequency of the vertical synchronization decreases, a light emission period of each area decreases, and thus flicker may be perceived. When the number of column signals increases or the luminance of the light source element decreases in the local dimming, a proportion of areas emitting light in one vertical scanning period decreases, and thus flicker may be perceived.

Figure 4:
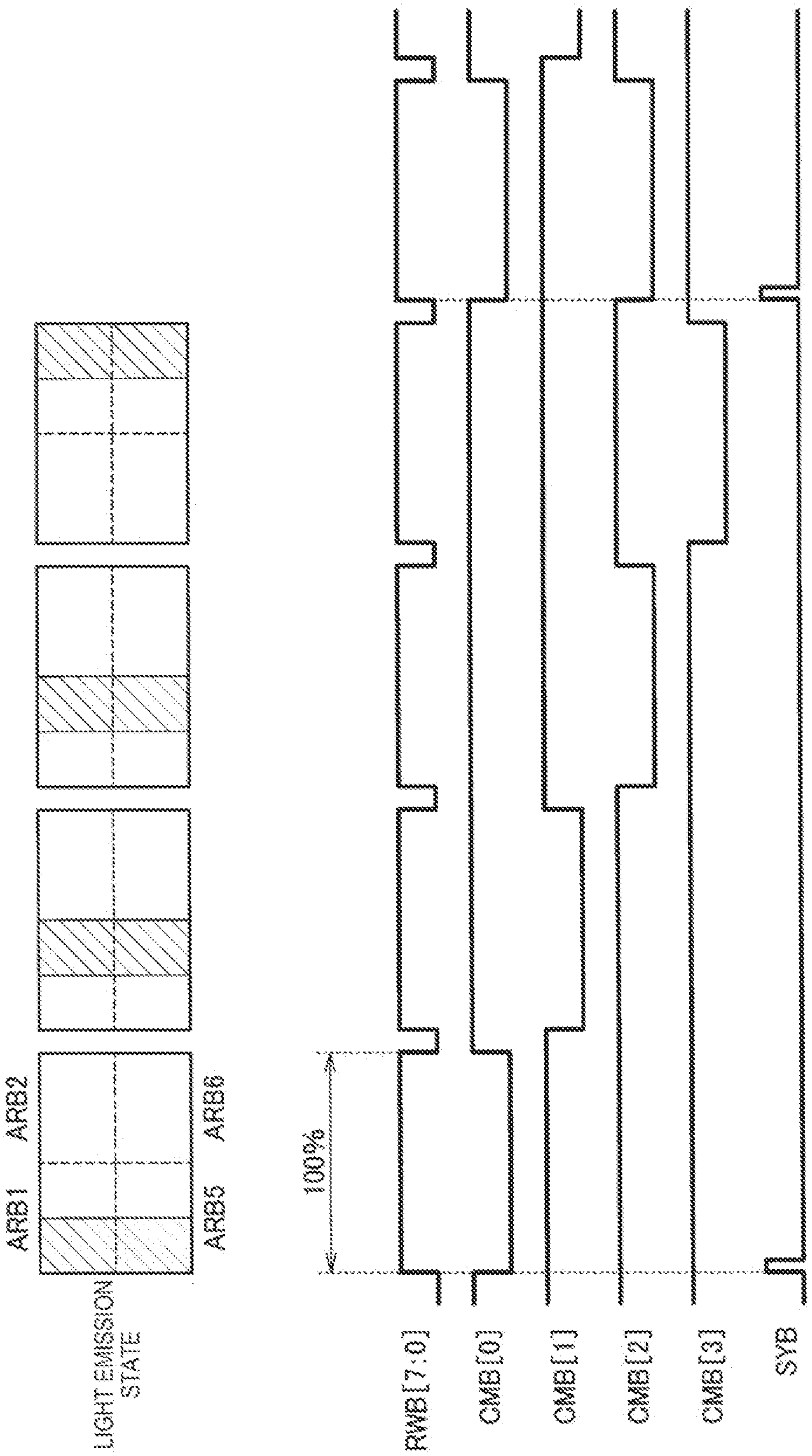
FIG. 4 is a diagram showing an example in which the backlight flicker may be visible.

FIG. 4 is a second example of the signal waveform and the light emission state. The signal waveform is the same as that in FIG. 3. FIG. 4 shows an example of a light emission state where a connection relationship between the column lines and the row lines and the light source elements is different from that in FIG. 2.

Although a detailed connection relationship is not shown, 4×8 light source elements are arranged in four areas driven by the light source driver DRB1, and the light source elements in a first column and a second column are coupled to the first column line. Similarly, the light source elements in a third column and a fourth column, in a fifth column and a sixth column, and in a seventh column and an eighth column are coupled to the second column line, the third column line, and the fourth column line, respectively. That is, when the column signal CMB [0] is at a low level, the light source elements in the first column and the second column emit light. Similarly, when the column signals CMB [1], CMB [2], and CMB [3] are at a low level, the light source elements in the third column and the fourth column, in the fifth column and the sixth column, and in the seventh column and the eighth column emit light.

In FIG. 4, each area emits light only in a ½ period of one vertical scanning period, and is turned off during a remaining ½ period. That is, similar to FIG. 3, each area has a period during which no light is emitted in one vertical scanning period, which may cause flicker to be perceived.

2. First Embodiment

Figure 5:
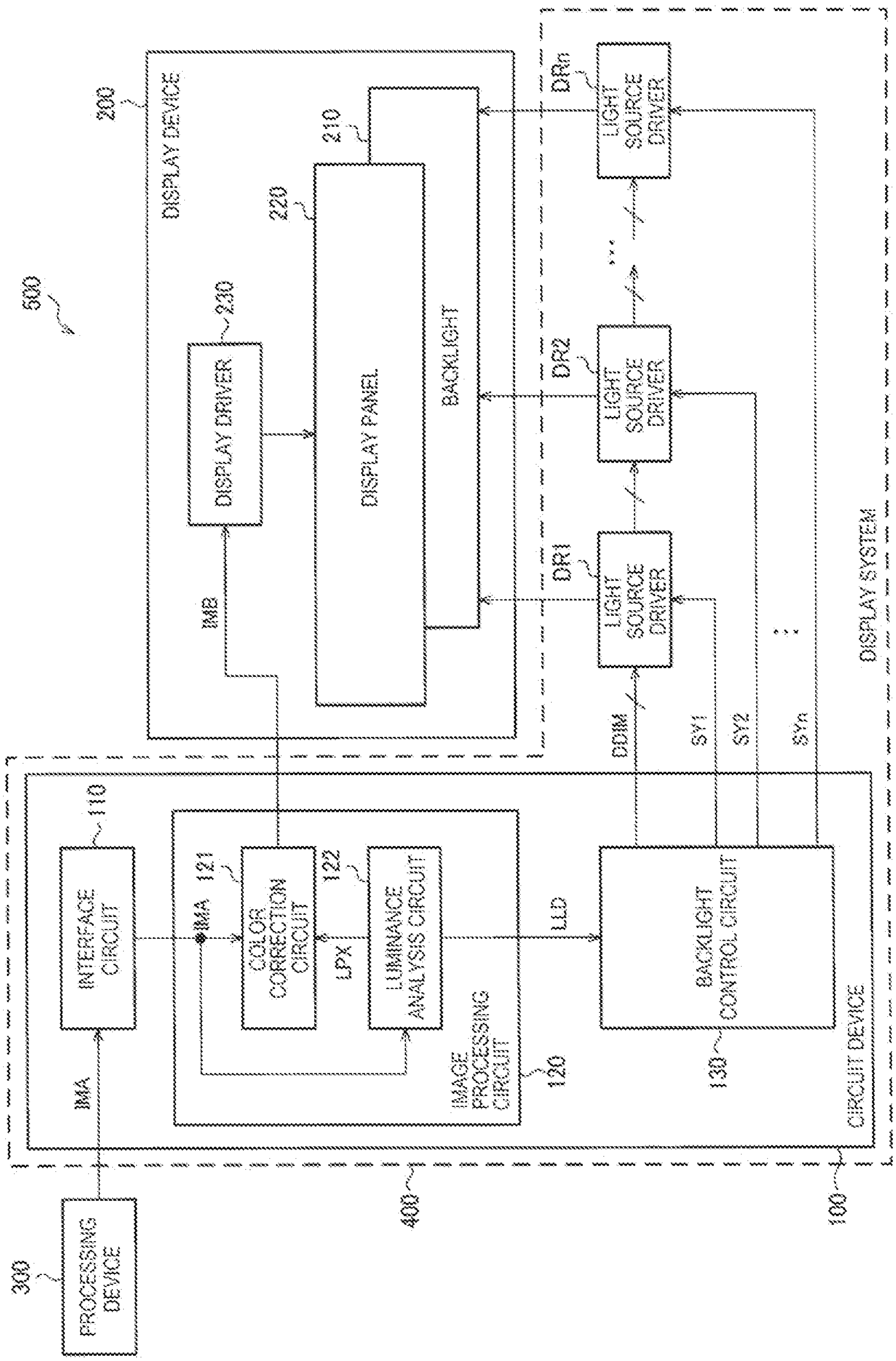
FIG. 5 is a configuration example of an electronic device including a display system according to the present embodiment.

FIG. 5 is a configuration example of an electronic device including a display system according to the present embodiment. An electronic device 500 includes a display device 200, a processing device 300, and a display system 400. As an example, the electronic device 500 is an in-vehicle cluster panel including a display, an in-vehicle display device including a head-up display, a television device, or an information processing device including a display.

The display device 200 includes a backlight 210, a display panel 220, and a display driver 230. The display panel 220 is an electro-optical panel that transmits light from the backlight 210 and displays an image by controlling a transmittance thereof. For example, the display panel 220 is a liquid crystal display panel. The display driver 230 receives image data IMB from the display system 400 and drives the display panel 220 based on the image data IMB to display an image on the display panel 220.

Various types of the display device 200 are assumed. As an example, the display device 200 is a display used for a television device, an information processing device, or the like. Alternatively, the display device 200 may be a head-mounted display including an eye projection device, a head-up display including a screen projection device, or the like. When the display device 200 is a head-up display, the display device 200 further includes an optical system for projecting light emitted from the backlight 210 and transmitted through the display panel 220 onto a screen.

The display system 400 includes a circuit device 100 and a first light source driver DR1 to an n-th light source driver DRn. n is an integer of 2 or more. The circuit device 100 is, for example, an integrated circuit device in which a plurality of circuit elements are integrated on a semiconductor substrate. Similarly, each light source driver is, for example, an integrated circuit device. A part or all of the display system 400 may be incorporated in the display device 200. For example, the light source drivers DR1 to DRn may be incorporated in the display device 200, or the circuit device 100 and the light source drivers DR1 to DRn may be incorporated in the display device 200.

The circuit device 100 controls the display device 200 to display an image. The circuit device 100 controls the light source drivers DR1 to DRn to control local dimming in the display device 200. The circuit device 100 includes an interface circuit 110, an image processing circuit 120, and a backlight control circuit 130.

The interface circuit 110 receives image data IMA from the processing device 300. The processing device 300 is a CPU, a microcomputer, a DSP, an ASIC, an FPGA, or the like. The interface circuit 110 may be an interface circuit for various image interface systems such as an LVDS, a parallel RGB system, or a display port.

The image processing circuit 120 performs image processing on the image data IMA received by the interface circuit 110, and outputs the image data IMB subjected to the image processing to the display driver 230. The image processing circuit 120 includes a color correction circuit 121 and a luminance analysis circuit 122.

The luminance analysis circuit 122 analyzes a luminance of the image data IMB, determines a backlight emission luminance of each area based on the analysis result, and outputs dimming data LLD indicating the backlight emission luminance of each area to the backlight control circuit 130. For example, the luminance analysis circuit 122 determines, in an image area corresponding to the area of the backlight 210, the maximum luminance of pixel data belonging to the image area, determines the minimum backlight emission luminance within a range in which the maximum luminance can be displayed on the display device 200, and sets the minimum backlight emission luminance as the backlight emission luminance of the area.

The luminance analysis circuit 122 calculates, based on the backlight emission luminance of each area determined as described above, an illumination luminance with which the backlight 210 illuminates each pixel of the display panel 220, and outputs illumination luminance data LPX indicating the illumination luminance of each pixel to the color correction circuit 121.

The color correction circuit 121 performs color correction on the image data IMA based on the illumination luminance data LPX, and outputs the corrected image data IMB to the display driver 230. Specifically, the color correction circuit 121 multiplies the pixel data of each pixel by a reciprocal of the illumination luminance of the pixel, and sets the result as new pixel data of the pixel.

The backlight control circuit 130 outputs dimming data DDIM, which is dimming information indicating an emission luminance of each light source element, to the light source drivers DR1 to DRn based on the dimming data LLD indicating the backlight emission luminance of each area. The backlight control circuit 130 outputs, to the light source driver DR1, a first synchronization signal SY1 for controlling a synchronization timing of scan driving performed by the light source driver DR1. Similarly, the backlight control circuit 130 outputs, to the light source drivers DR2, . . . , and DRn, a second synchronization signal SY2, . . . , and an n-th synchronization signal SYn for controlling a synchronization timing of scan driving performed by the light source drivers DR2, . . . , and DRn.

The luminance analysis circuit 122, the color correction circuit 121, and the backlight control circuit 130 are logic circuits that process a digital signal. The luminance analysis circuit 122, the color correction circuit 121, and the backlight control circuit 130 may each include a separate logic circuit, or some or all of them may each include an integrated logic circuit.

Alternatively, a processor such as a DSP may execute an instruction set or a program in which functions of the luminance analysis circuit 122, the color correction circuit 121, and the backlight control circuit 130 are described to implement functions of the circuits.

Figure 6:
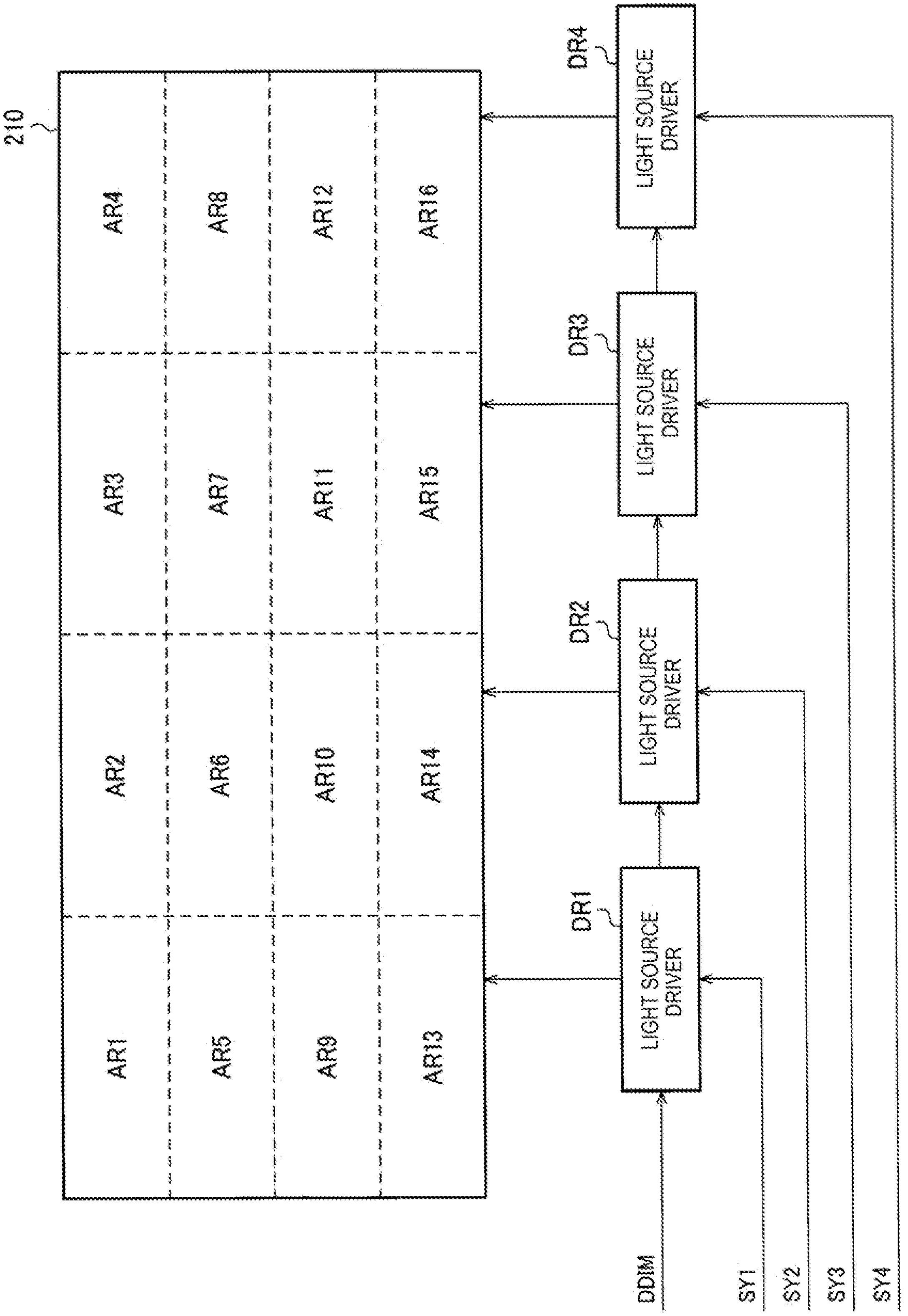
FIG. 6 is a diagram illustrating an area division of a backlight in a first embodiment.

FIG. 6 is a diagram showing an area division of the backlight in the first embodiment. In FIG. 6, the display panel 220 is not shown. FIG. 6 shows an example in which n=4, that is, four light source drivers drive the backlight, but the number of light source drivers that drive the backlight may be 2 or more.

In plan view with respect to the backlight 210, light source elements are two-dimensionally arranged in the backlight 210. In the plan view with respect to the backlight 210, the backlight 210 is divided into areas AR1 to AR16, and a plurality of light source elements are arranged in each area. The light source element is a light-emitting element that emits light by power supply, and is, for example, an inorganic light emitting diode or an organic light emitting diode. An example of the two-dimensional arrangement is a matrix arrangement, but the present disclosure is not limited thereto. The two-dimensional arrangement may be, for example, a staggered arrangement. The staggered arrangement is an arrangement in which the light source elements are arranged at intersections between one of odd and even rows and odd columns, and intersections between the other of the odd and even rows and even columns, and no light source element is arranged at other intersections.

Each area is a dimming unit for local dimming. That is, the plurality of light source elements arranged in one area are controlled to emit light with the same luminance. The light source elements arranged in different areas are controlled to emit light with mutually independent luminance. FIG. 6 shows an example in which the backlight is divided into 4×4 areas, and the areas may be divided into 2 or more rows and 2 or more columns.

The light source drivers DR1 to DR4 receive the dimming data DDIM which is dimming information indicating the emission luminance of each light source element. For example, the light source drivers DR1 to DR4 are coupled for cascade communication, and each light source driver acquires dimming data related to a light source element driven by itself from the dimming data DDIM transmitted through the cascade communication. Alternatively, the light source drivers DR1 to DR4 may be coupled in parallel to a communication bus, and each light source driver may acquire the dimming data related to the light source element driven by itself from the dimming data DDIM transmitted through the communication bus.

The synchronization signal SY1 is input to the light source driver DR1. Similarly, the synchronization signals SY2, SY3, and SY4 are input to the light source drivers DR2, DR3, and DR4, respectively. The synchronization signals SY1 to SY4 are signals synchronized with a vertical synchronization signal for image display, and are signals having different phases.

The light source driver DR1 drives a first light source element group among a plurality of light source elements arranged in each of the areas AR1 to AR16. Similarly, the light source drivers DR2, DR3, and DR4 respectively drive a second light source element group, a third light source element group, and a fourth light source element group among the plurality of light source elements arranged in each area.

Figure 7:
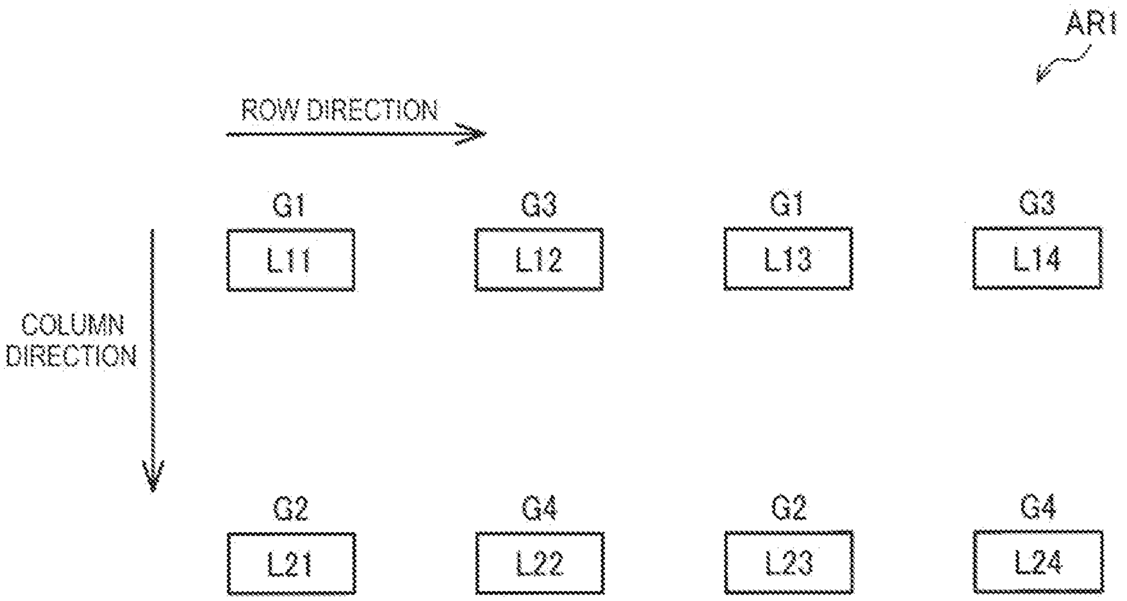
FIG. 7 is a diagram illustrating light source element groups.

FIG. 7 is a diagram showing light source element groups. Here, an example of the area AR1 is shown, and the same applies to the other areas AR2 to AR16. Here, an example in which 2×4 light source elements are arranged in a matrix in one area is shown. In the matrix arrangement, for example, a light source element arranged in a first row and a second column is described as L12.

In this example, light source elements L11 and L13 belong to a first light source element group G1 and are driven by the light source driver DR1. Similarly, light source elements L21 and L23, light source elements L12 and L14, and light source elements L22 and L24 belong to a second light source element group G2, a third light source element group G3, and a fourth light source element group G4, respectively, and are driven by the light source drivers DR2, DR3, and DR4, respectively.

The light source elements L12 and L14 belonging to the third light source element group G3 are disposed adjacent to a row direction side of the light source elements L11 and L13 belonging to the first light source element group G1. The light source elements L21 and L23 belonging to the second light source element group G2 are disposed adjacent to a column direction side of the light source elements L11 and L13 belonging to the first light source element group G1. The light source elements L22 and L24 belonging to the fourth light source element group G4 are disposed adjacent to a column direction side of the light source elements L12 and L14 belonging to the third light source element group G3, and are disposed adjacent to a row direction side of the light source elements L21 and L23 belonging to the second light source element group G2.

FIGS. 8 to 11 show examples of a connection between the light source drivers and the light source elements in the first embodiment. Here, an example in which 2×4 light source elements are arranged in a matrix in each area is shown, but a plurality of light source elements may be arranged in each area.

A first column line group transmitting a column signal CM1 [3:0] and a first row line group transmitting a row signal RW1 [7:0] are coupled to the light source driver DR1. A second column line group transmitting a column signal CM2 [3:0] and a second row line group transmitting a row signal RW2 [7:0] are coupled to the light source driver DR2. A third column line group transmitting a column signal CM3 [3:0] and a third row line group transmitting a row signal RW3 [7:0] are coupled to the light source driver DR3. A fourth column line group transmitting a column signal CM4 [3:0] and a fourth row line group transmitting a row signal RW4 [7:0] are coupled to the light source driver DR4. The column signal is a signal for selecting the light source element 10 to emit light. The row signal is a PWM signal for driving the light source element 10 selected by the column signal, and the light source element to which a PWM signal is applied emits light with a luminance corresponding to a pulse width of the PWM signal.

Figure 8:
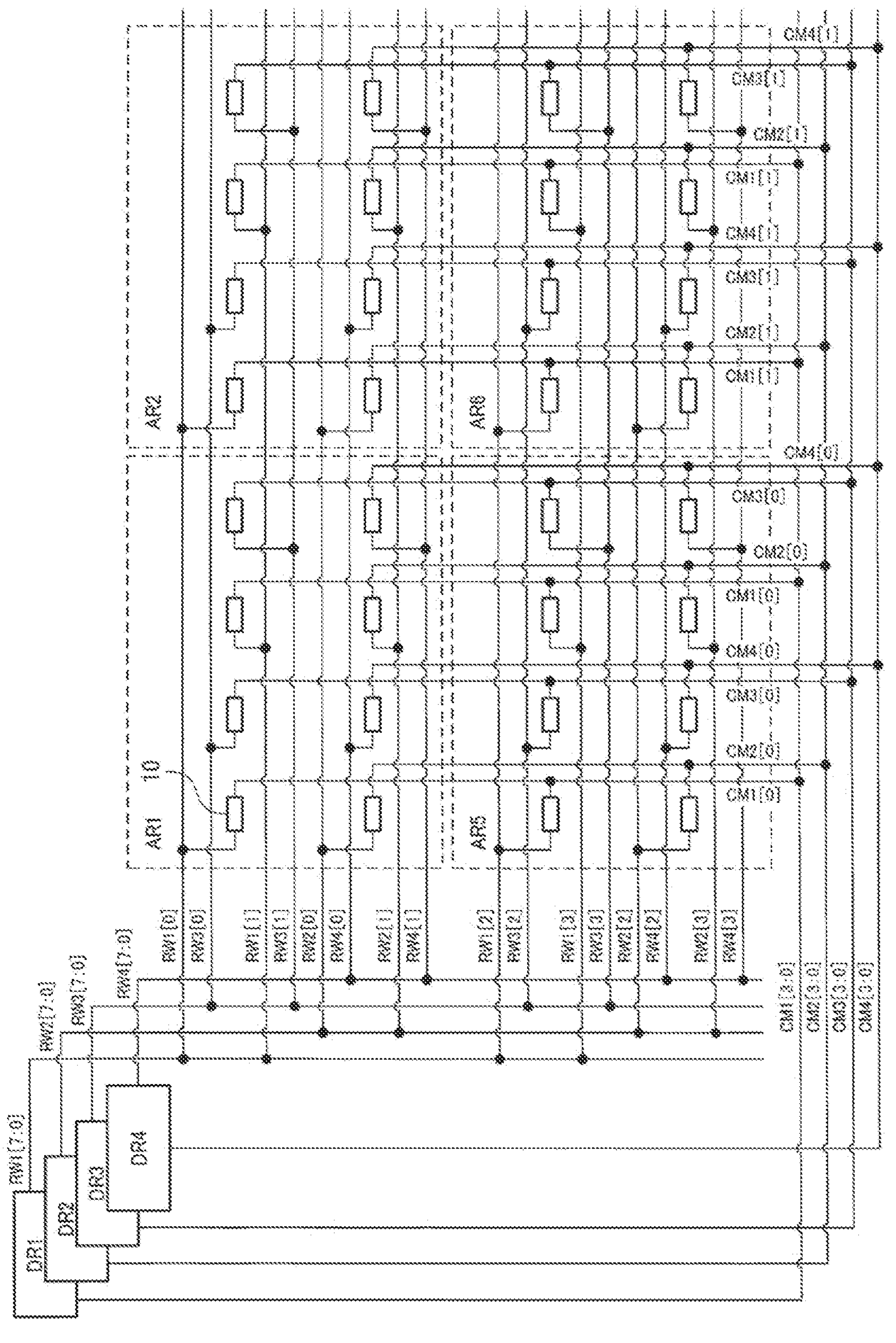
FIG. 8 shows an example of connections between light source drivers and light source elements in the first embodiment.

As shown in FIG. 8, the light source driver DR1 outputs a column signal CM1 [0] to a first column line of the first column line group. Similarly, the light source drivers DR2, DR3, and DR4 output column signals CM2 [0], CM3 [0], and CM4 [0] to first column lines of the second column line group, the third column line group, and the fourth column line group, respectively.

In the area AR1, the light source element 10 in a first row and a first column and the light source element in the first row and a third column are coupled to the first column line of the first column line group. Similarly, in the area AR1, the light source element 10 in a second row and the first column and the light source element 10 in the second row and the third column, the light source element 10 in the first row and a second column and the light source element 10 in the first row and a fourth column, and the light source element 10 in the second row and the second column and the light source element 10 in the second row and the fourth column are coupled to the respective first column lines of the second column line group, the third column line group, and the fourth column line group. In the area AR5, the column lines and the light source elements 10 are also coupled according to the same rule.

The light source driver DR1 outputs a column signal CM1 [1] to a second column line of the first column line group. Similarly, the light source drivers DR2, DR3, and DR4 output column signals CM2 [1], CM3 [1], and CM4 [1] to respective second column lines of the second column line group, the third column line group, and the fourth column line group.

In the area AR2, the light source element 10 in a first row and a first column and the light source element 10 in the first row and a third column are coupled to a second column line of the first column line group. Similarly, in the area AR2, the light source element 10 in a second row and the first column and the light source element 10 in the second row and the third column, the light source element 10 in the first row and a second column and the light source element 10 in the first row and a fourth column, and the light source element 10 in the second row and the second column and the light source element 10 in the second row and the fourth column are coupled to respective second column lines of the second column line group, the third column line group, and the fourth column line group. In the area AR6, the column lines and the light source elements 10 are also coupled according to the same rule.

The light source driver DR1 outputs a row signal RW1 [0] to a first row line of the first row line group and outputs a row signal RW1 [1] to a second row line of the first row line group. Similarly, the light source driver DR2 outputs row signals RW2 [0] and RW2 [1] to a first row line and a second row line of the second row line group. The light source driver DR3 outputs row signals RW3 [0] and RW3 [1] to a first row line and a second row line of the third row line group. The light source driver DR4 outputs row signals RW4 [0] and RW4 [1] to a first row line and a second row line of the fourth row line group.

In the area AR1, the light source element 10 in the first row and the first column is coupled to the first row line of the first row line group. Similarly, the light source element 10 in the second row and the first column, the light source element 10 in the first row and the second column, and the light source element 10 in the second row and the second column are coupled to the respective first row lines of the second row line group, the third row line group, and the fourth row line group. The light source element 10 in the first row and the third column, the light source element 10 in the second row and the third column, the light source element 10 in the first row and the fourth column, and the light source element 10 in the second row and the fourth column are coupled to the respective second row lines of the first row line group, the second row line group, the third row line group, and the fourth row line group. In the area AR2, the row lines and the light source elements 10 are also coupled according to the same rule.

The light source driver DR1 outputs a row signal RW1 [2] to a third row line of the first row line group and outputs a row signal RW1 [3] to a fourth row line of the first row line group. Similarly, the light source driver DR2 outputs row signals RW2 [2] and RW2 [3] to a third row line and a fourth row line of the second row line group, respectively. The light source driver DR3 outputs row signals RW3 [2] and RW3 [3] to a third row line and a fourth row line of the third row line group, respectively. The light source driver DR4 outputs row signals RW4 [2] and RW4 [3] to a third row line and a fourth row line of the fourth row line group, respectively.

In the area AR5, the light source element 10 in a first row and a first column is coupled to the third row line of the first row line group. Similarly, the light source element 10 in a second row and the first column, the light source element 10 in the first row and a second column, and the light source element 10 in the second row and the second column are coupled to the respective third row lines of the second row line group, the third row line group, and the fourth row line group. The light source element 10 in the first row and a third column, the light source element in the second row and the third column, the light source element 10 in the first row and a fourth column, and the light source element 10 in the second row and the fourth column are coupled to the respective fourth row lines of the first row line group, the second row line group, the third row line group, and the fourth row line group. In the area AR6, the row lines and the light source elements are also coupled according to the same rule.

Figure 9:
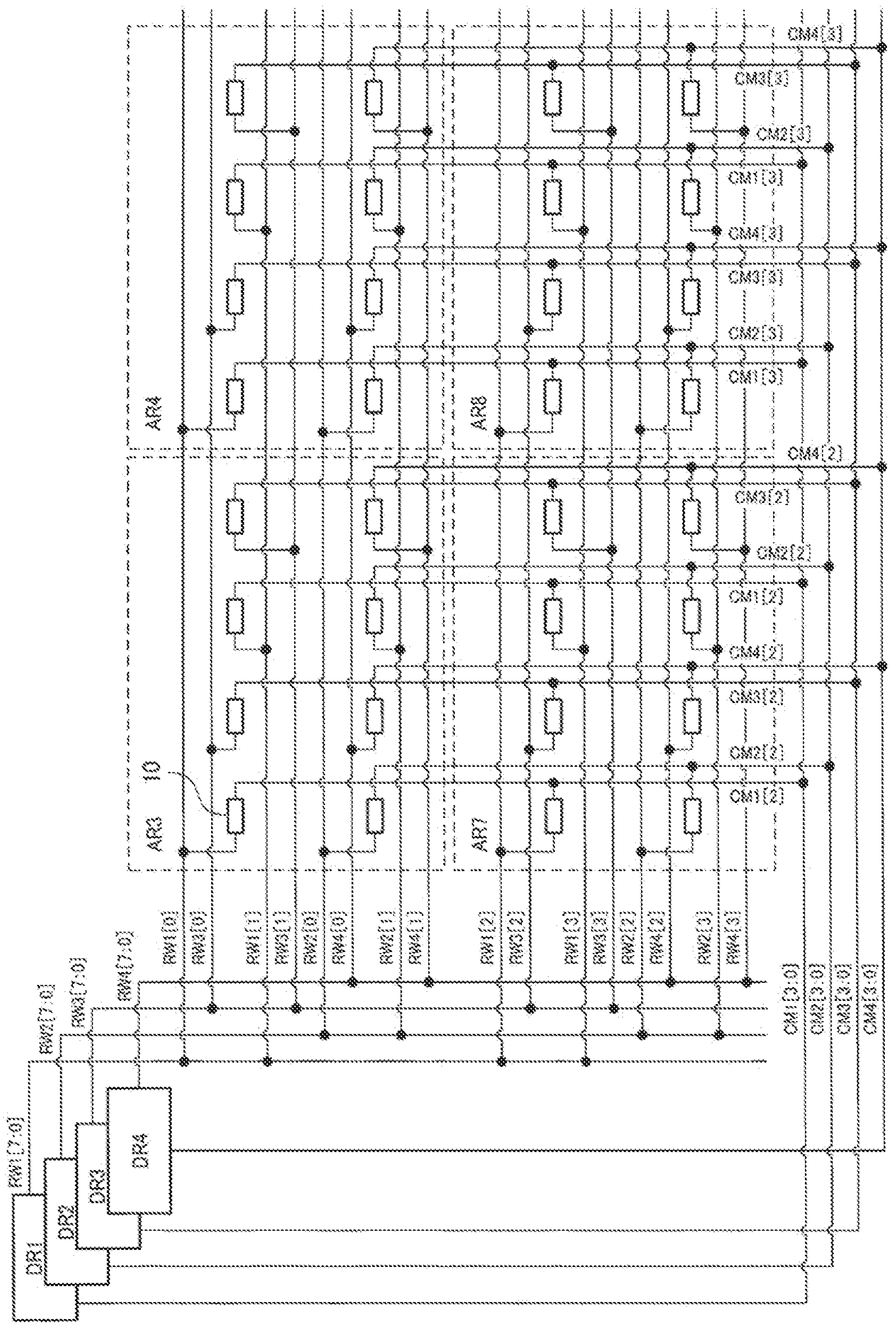
FIG. 9 shows an example of connections between the light source drivers and light source elements in the first embodiment.
Figure 10:
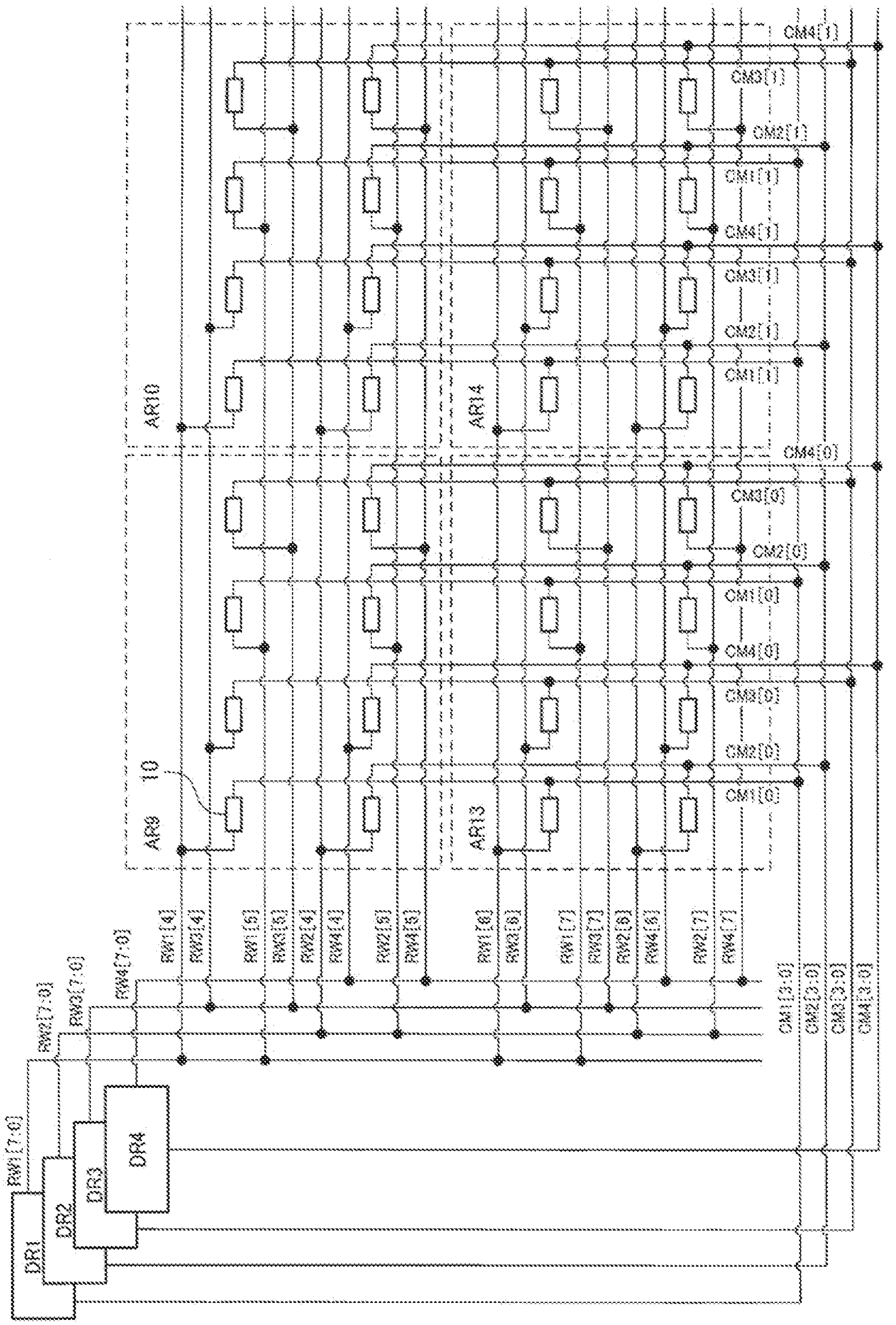
FIG. 10 shows an example of connections between the light source drivers and light source elements in the first embodiment.
Figure 11:
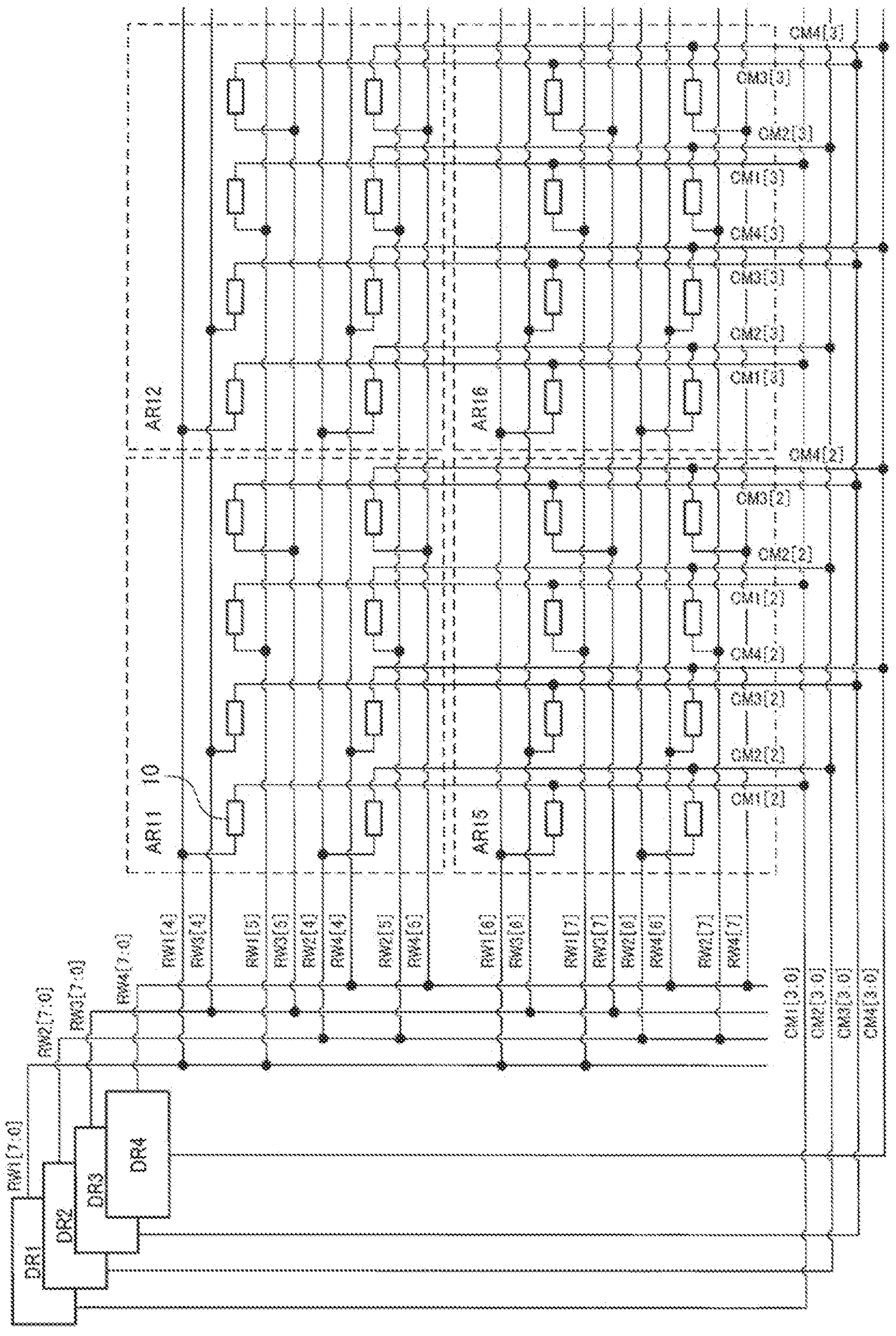
FIG. 11 shows an example of connections between the light source drivers and light source elements in the first embodiment.

FIG. 9 shows an example of connections between the light source drivers DR1 to DR4 and the light source elements 10 in the areas AR3, AR4, AR7, and AR8. FIG. 10 shows an example of connections between the light source drivers DR1 to DR4 and the light source elements 10 in the areas AR9, AR10, AR13, and AR14. FIG. 11 shows an example of connections between the light source drivers DR1 to DR4 and the light source elements 10 in the areas AR11, AR12, AR15, and AR16. The connection rules between the column lines and the row lines and the light source elements 10 shown in FIGS. 9 to 11 are based on FIG. 8, and thus the description thereof will be omitted.

Figure 12:
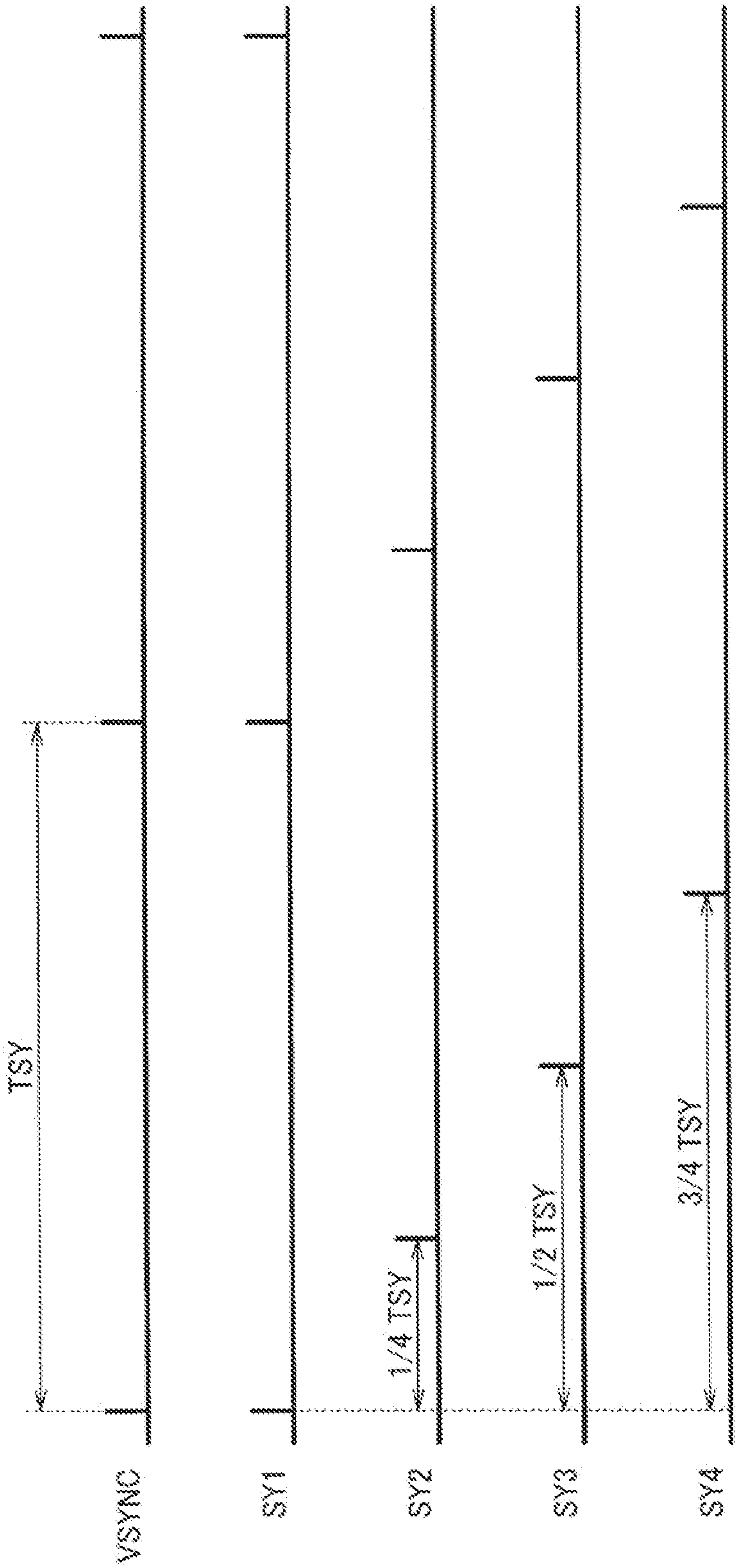
FIG. 12 shows a waveform example of a synchronization signal.

FIG. 12 is a waveform example of the synchronization signal. FIG. 12 shows a waveform example when n=4.

The backlight control circuit 130 outputs the synchronization signals SY1 to SY4, which are pulse signals indicating a first synchronization timing to a fourth synchronization timing, to the light source drivers DR1 to DR4 based on a vertical synchronization signal VSYNC. The synchronization signals are synchronized with the vertical synchronization signal VSYNC, and differ in phase by 1/n=¼ period. Specifically, a pulse of the synchronization signal SY1 is output at a timing same as that of a pulse of the vertical synchronization signal VSYNC. A pulse of the synchronization signal SY2 is output with a delay of ¼ TSY from the pulse of the vertical synchronization signal VSYNC, where TSY is a length of one period in the vertical synchronization signal VSYNC for image display. A pulse of the synchronization signal SY3 is output with a delay of ½ TSY from the pulse of the vertical synchronization signal VSYNC, and a pulse of the synchronization signal SY4 is output with a delay of ¾ TSY from the pulse of the vertical synchronization signal VSYNC.

Figure 13:
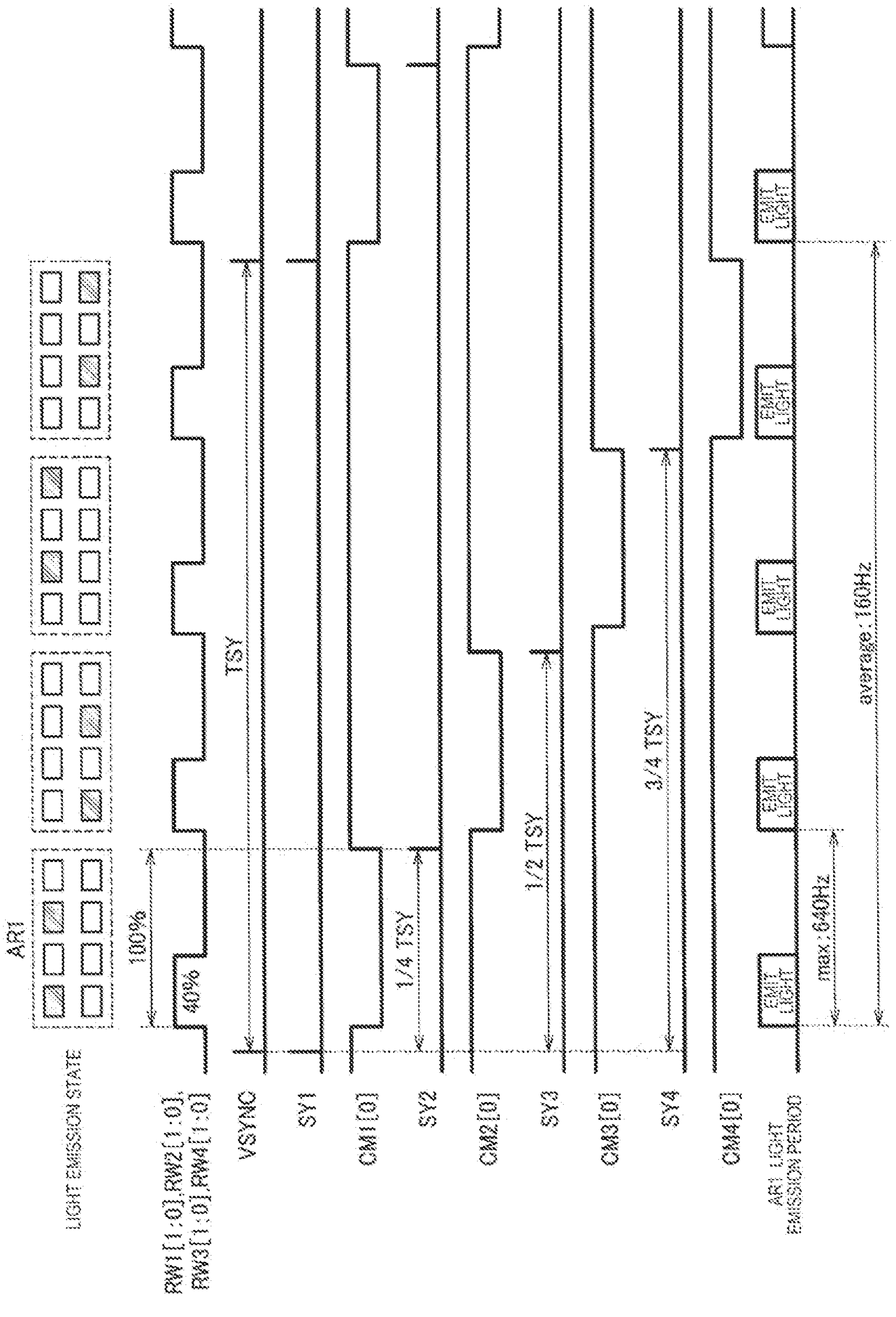
FIG. 13 shows an example of a first signal waveform in the first embodiment and an example of a light emission state in a connection state in FIGS. 8 to 11.
Figure 14:
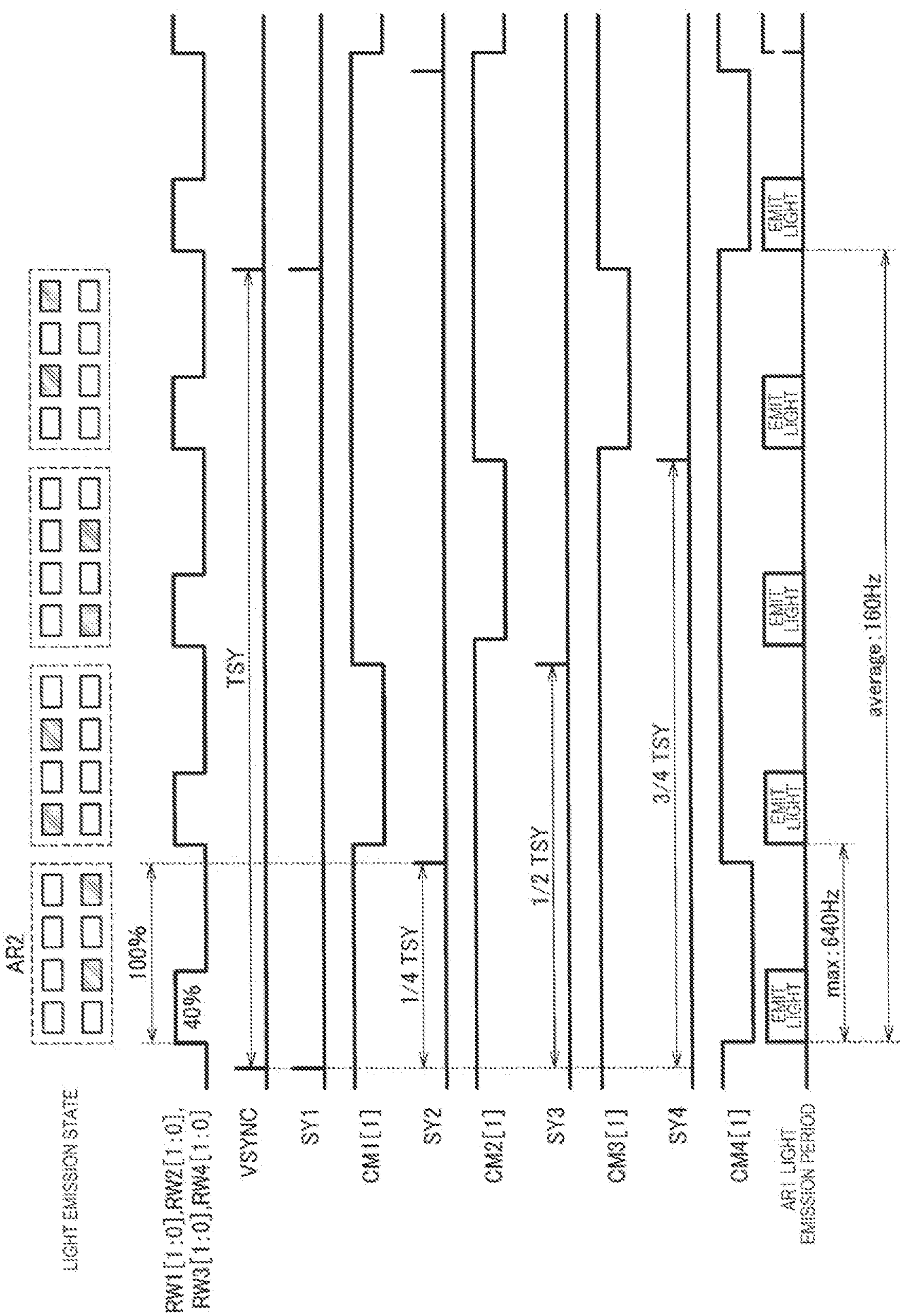
FIG. 14 shows an example of the first signal waveform in the first embodiment and an example of the light emission state in the connection state in FIGS. 8 to 11.

FIGS. 13 and 14 show examples of a first signal waveform in the first embodiment and examples of a light emission state in a connection state in FIGS. 8 to 11. The luminance of the light source element is shown as a percentage with the maximum luminance being 100%. Here, an example in which the light source elements emit light with a luminance of 40% is shown, but the luminance of the light source elements in each area may be optional. Here, the areas AR1 and AR2 are described as an example, and the waveforms and light emission states of other areas are also determined according to the same rule according to the connections between the column lines and the light source elements.

As shown in FIG. 13, the light source driver DR1 outputs the PWM signal with four periods as a row signal RW1 [1:0] between pulses of the synchronization signal SY1. The light source driver DR1 sets the column signal CM1 [0] to a low level in the first period of the PWM signal after the pulse of the synchronization signal SY1 is input. Similarly, the light source drivers DR2, DR3, and DR4 output the PWM signals with four periods as row signals RW2 [1:0], RW3 [1:0], and RW4 [1:0], respectively, between the pulses of the synchronization signals SY2, SY3, and SY4. The light source drivers DR2, DR3, and DR4 set the column signals CM2 [0], CM3 [0], and CM4 [0] to a low level in the first period of the PWM signal after the pulses of the synchronization signals SY2, SY3, and SY4 are input.

As described in FIG. 12, since the phases of the synchronization signals SY1 to SY4 are shifted by ¼ TSY, the column signals CM1 [0], CM2 [0], CM3 [0], and CM4 [0] are at a low level in order with a shift of ¼ TSY in one period of the vertical synchronization signal VSYNC.

The light source element 10 is selected when a low-level column signal is input, and emits light with a luminance corresponding to the pulse width of the PWM signal during the selected period. In the area AR1, the light source elements 10 in the first column and the third column of the first row, the light source elements 10 in the first column and the third column of the second row, the light source elements 10 in the second column and the fourth column of the first row, and the light source elements 10 in the second column and the fourth column of the second row are selected by the column signals CM1 [0], CM2 [0], CM3 [0], and CM4 [0]. Therefore, as shown in an upper part of FIG. 13, in the area AR1, the light source elements 10 in the first column and the third column of the first row, the light source elements 10 in the first column and the third column of the second row, the light source elements in the second column and the fourth column of the first row, and the light source elements 10 in the second column and the fourth column of the second row emit light in this order.

As shown in FIG. 14, the light source driver DR1 sets the column signal CM1 [1] to a low level in the second period of the PWM signal after the pulse of the synchronization signal SY1 is input. Similarly, the light source drivers DR2, DR3, and DR4 set the column signals CM2 [1], CM3 [1], and CM4 [1] to a low level in the second period of the PWM signal after the pulses of the synchronization signals SY2, SY3, and SY4 are input.

In the area AR2, the light source elements 10 in the second column and the fourth column of the second row, the light source elements 10 in the first column and the third column of the first row, the light source elements in the first column and the third column of the second row, and the light source elements 10 in the second column and the fourth column of the first row are selected by the column signals CM4 [1], CM1 [1], CM2 [1], and CM3 [1]. Therefore, as shown in an upper part of FIG. 14, in the area AR2, the light source elements 10 in the second column and the fourth column of the second row, the light source elements 10 in the first column and the third column of the first row, the light source elements 10 in the first column and the third column of the second row, and the light source elements 10 in the second column and the fourth column of the first row emit light in this order.

The column signals CM1 [2], CM2 [2], CM3 [2], and CM4 [2] are waveforms further delayed by ¼ TSY from the column signals CM1 [1], CM2 [1], CM3 [1], and CM4 [1]. The column signals CM1 [3], CM2 [3], CM3 [3], and CM4 [3] are waveforms further delayed by ¼ TSY from the column signals CM1 [2], CM2 [2], CM3 [2], and CM4 [2].

In the example in FIGS. 1 to 4, when attention is focused on a certain area, there is a PWM period during which all the light source elements in the area are not turned on among four PWM periods in one vertical scanning period. In the present embodiment, any of the light source elements in the area is turned on in any of the four PWM periods in one vertical scanning period. For example, when the frequency of the PWM signal is 640 Hz, a blinking period of the light source and a blinking period of the area are the same, 160 Hz in the example in FIG. 3. In the present embodiment, the blinking period of the light source is 160 Hz, but the blinking period of the area is 640 Hz which is the same as that of the PWM signal. In this way, the flicker can be made inconspicuous by always turning on any of the light source elements in the area.

In FIGS. 12 to 14, lengths of one period of the synchronization signals SY1 to SY4 are the same as a length of the vertical scanning period, but the present disclosure is not limited thereto, and lengths of a plurality of periods of the synchronization signals SY1 to SY4 may be the same as the length of the vertical scanning period. Hereinafter, an example in which lengths of two periods of the synchronization signals SY1 to SY4 are the same as the length of the vertical scanning period will be described.

Figure 18:
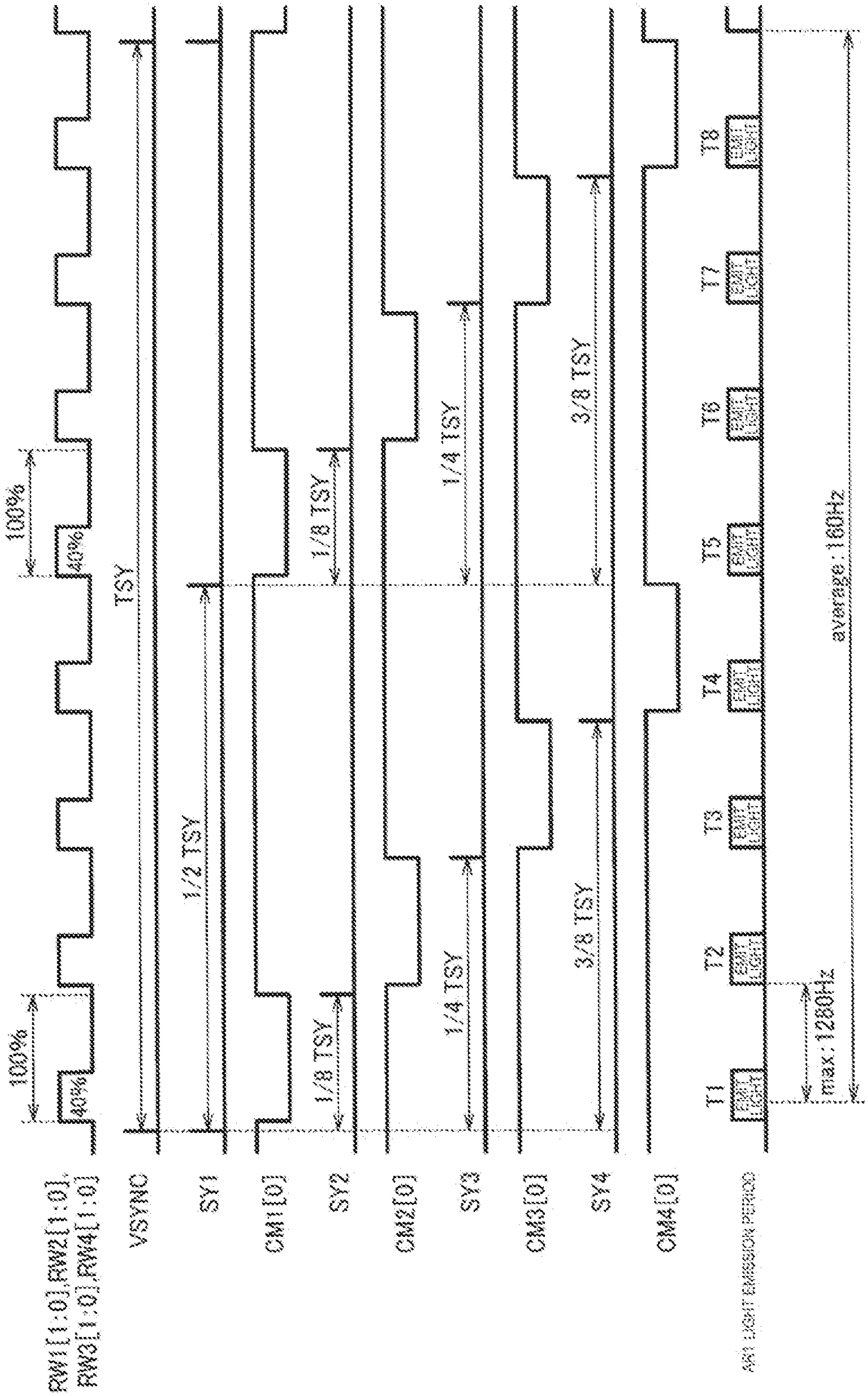
FIG. 18 shows an example of a second signal waveform in the first embodiment.
Figure 19:
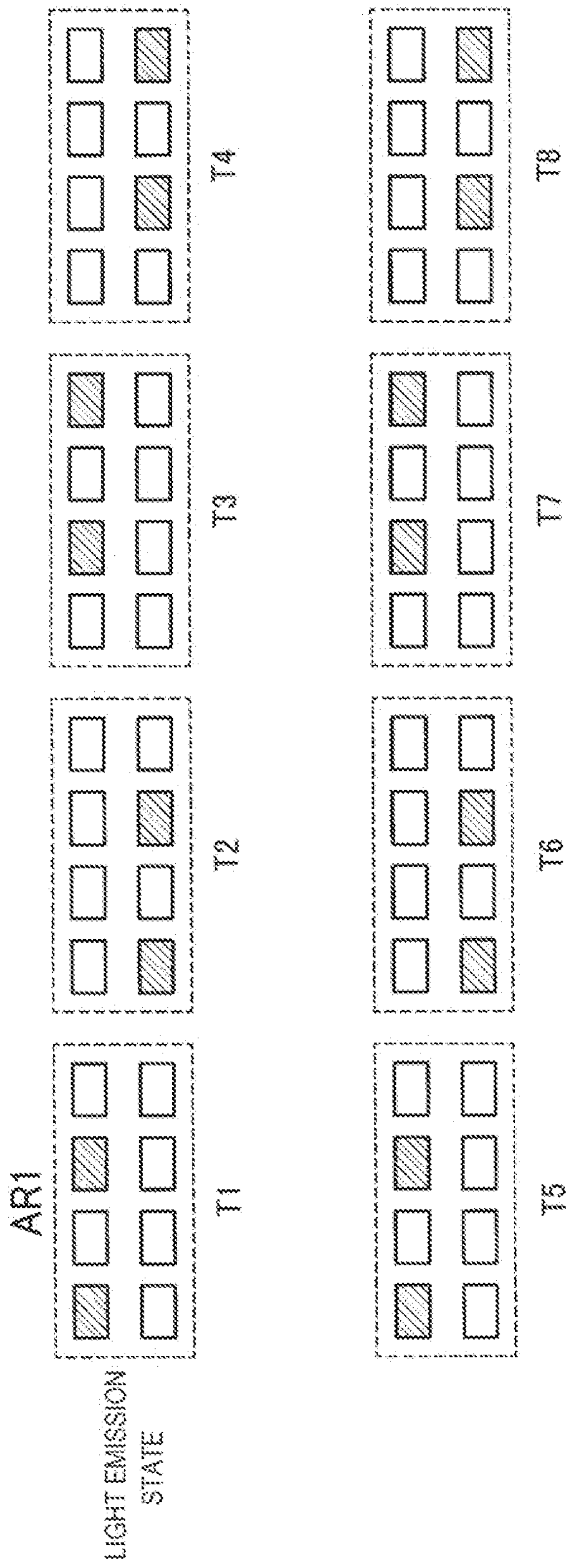
FIG. 19 shows an example of a light emission state in the example of the second signal waveform.

FIG. 18 shows an example of a second signal waveform in the first embodiment. FIG. 19 shows an example of a light emission state in the example of the second signal waveform.

As shown in FIG. 18, the synchronization signals SY1 to SY4 are synchronized with the vertical synchronization signal VSYNC, and differ in phase by 1/(2×n)=⅛ period. Specifically, the pulse of the synchronization signal SY1 is output at a timing same as that of the pulse of the vertical synchronization signal VSYNC and at a timing delayed by ½ TSY from the pulse of the vertical synchronization signal VSYNC. The pulse of the synchronization signal SY2 is output at a timing delayed by ⅛ TSY from the pulse of the vertical synchronization signal VSYNC and at a timing delayed by ½ TSY+⅛ TSY=⅝ TSY from the pulse of the vertical synchronization signal VSYNC. The pulse of the synchronization signal SY3 is output at a timing delayed by ¼ TSY from the pulse of the vertical synchronization signal VSYNC and at a timing delayed by ½ TSY+¼ TSY=¾ TSY from the pulse of the vertical synchronization signal VSYNC. The pulse of the synchronization signal SY4 is output at a timing delayed by ⅜ TSY from the pulse of the vertical synchronization signal VSYNC and at a timing delayed by ½ TSY+⅜ TSY=⅞ TSY from the pulse of the vertical synchronization signal VSYNC.

The light source drivers DR1 to DR4 output PWM signals with eight periods as row signals RW1 [1:0], RW2 [1:0], RW3 [1:0], and RW4 [1:0] between pulses of the vertical synchronization signal VSYNC. In one period of the synchronization signals SY1 to SY4, the PWM signals with four periods are output. An operation in one period of each synchronization signal is the same as that in FIG. 13.

As shown in an "AR1 light emission period" in FIG. 18, light emission periods in one vertical scanning period are set as T1 to T8. As shown in FIG. 19, in the area AR1, the light source elements 10 in the first column and the third column of the first row emit light during the light emission period T1, the light source elements 10 in the first column and the third column of the second row emit light during the light emission period T2, the light source elements 10 in the second column and the fourth column of the first row emit light during the light emission period T3, and the light source elements 10 in the second column and the fourth column of the second row emit light during the light emission period T4 in this order. In T5 to T8, the light source elements in the area AR1 emit light in the same order. Thus, in the second waveform example, a light emission pattern is repeated twice in one vertical scanning period. When x is an integer of 2 or more and the lengths of the x period of the synchronization signals SY1 to SY4 are the same as the length of the vertical scanning period, the light emission pattern is repeated x times in one vertical scanning period.

In the above embodiment, the display system 400 includes the circuit device 100 and the light source drivers DR1 to DR4. The circuit device 100 performs local dimming control of the display device 200 including the display panel 220 and the backlight 210. The light source drivers DR1 to DR4 drive the backlight 210 based on the dimming information of the local dimming control. An i-th light source driver DR1 PWM-drives an i-th light source element group Gi among the light source element groups G1 to G4 provided in a target area based on the dimming information for the target area. i is an integer of 1 or more and n=4 or less. The target area is an area to be driven by the light source drivers DR1 to DR4 among the plurality of areas AR1 to AR16 of the backlight 210 in the local dimming control.

In the example in FIGS. 6 to 11, the target area is any area among the areas AR1 to AR16. For example, the area AR1 is the target area. In the example in FIG. 7, the light source element groups G1 to G4 are provided in the area AR1, and respective two light source elements belong to each of the light source element groups. The i-th light source driver DR1 PWM-drives the two light source elements belonging to the i-th light source element group Gi based on dimming information for the area AR1.

According to the present embodiment, both a countermeasure against flicker of the backlight and local dimming in which the backlight emits light with independent brightness for each area can be achieved. Specifically, the first light source driver DR1 to the fourth light source driver DR4 drive the first light source element group to the fourth light source element group in the target area, respectively, so that light emission timings of the respective light source element groups can be different from each other. Since the light emission timings of the light source element groups are different from each other, any of the light source elements in the area can be turned on in each PWM period. Accordingly, the apparent light emission frequency in the entire area can be improved, and thus the flicker can be reduced and the display quality of the display device including the backlight 210 can be improved.

In the present embodiment, the light source drivers DR1 to DR4 PWM-drive the light source element groups G1 to G4 at different timings.

According to the present embodiment, the light source drivers DR1 to DR4 can sequentially PWM-drive the light source element groups G1 to G4 at different timings in a period having a length same as that of one period of the scan driving performed by the light source driver. The scan driving means that the light source driver sequentially drives the plurality of column lines to sequentially drive the light source elements coupled to the respective column lines. In the present embodiment, a length of one period of the scan driving is the same as the length TSY of the vertical scanning period of the image display, but the length of one period of the scan driving may be different from the length TSY.

In the present embodiment, a j-th light source driver DRj starts driving a j-th light source element group Gj at a j-th synchronization timing. j is an integer of 1 or more and n−1 or less. A (j+1)-th light source driver DRj+1 starts driving a (j+1)-th light source element group Gj+1 at a (j+1)-th synchronization timing after the j-th synchronization timing.

In the example in FIG. 13, the synchronization timing corresponds to a pulse timing of the synchronization signals SY1 to SY4. According to a pulse of a synchronization signal SYj, the j-th light source driver DRj sets a column signal CMj [0] to a low level to drive the j-th light source element group Gj, and thereafter, according to a pulse of a synchronization signal SYj+1, the (j+1)-th light source driver DRj+1 sets a column signal CMj+1 [0] to a low level to drive the (j+1)-th light source element group Gj+1.

According to the present embodiment, the light source drivers DR1 to DR4 drive the light source element groups G1 to G4 at the first synchronization timing to the fourth synchronization timing in a forward direction. Accordingly, the light source drivers DR1 to DR4 can sequentially PWM-drive the light source element groups G1 to G4 at different timings in the period having a length same as that of one period of the scan driving performed by the light source driver.

In the present embodiment, the circuit device 100 outputs the synchronization signals SY1 to SY4 to the light source drivers DR1 to DR4. The light source drivers DR1 to DR4 PWM-drive the light source element groups G1 to G4 at different timings based on the synchronization signals SY1 to SY4.

According to the present embodiment, the timing at which the light source drivers DR1 to DR4 drive the light source element groups G1 to G4 can be controlled by the circuit device 100 outputting the synchronization signals SY1 to SY4. Accordingly, the circuit device 100 can cause the light source drivers DR1 to DR4 to PWM-drive the light source element groups G1 to G4 at different timings.

In the present embodiment, the circuit device 100 outputs the synchronization signals SY1 to SY4 whose timings are different from each other to the light source drivers DR1 to DR4 in synchronization with the vertical synchronization signal.

According to the present embodiment, in the vertical scanning period during which the light source driver performs the scan driving, the light source drivers DR1 to DR4 can sequentially PWM-drive the light source element groups G1 to G4 at different timings.

In the present embodiment, the light source elements 10 belonging to the light source element groups G1 to G4 are two-dimensionally arranged in the plan view with respect to the backlight 210.

According to the present embodiment, by dividing the plurality of light source elements 10 arranged two-dimensionally in the plan view with respect to the backlight 210 into a plurality of areas, the local dimming control for independently controlling light emission luminance of each area can be performed. By sequentially driving the light source elements 10 belonging to the first light source element group to the fourth light source element group in each area at different timings, both local dimming and flicker reduction can be achieved.

In the present embodiment, a first light source element of the light source element group G1 and a second light source element of the light source element group G2 are arranged adjacent to each other in one direction of a column direction and a row direction in the two-dimensional arrangement.

In the example in FIG. 7, the first light source element of the light source element group G1 is the light source element L11, and the second light source element of the light source element group G2 is the light source element L21. In FIG. 7, the light source elements L11 and L21 are adjacent to each other in the column direction, but may be adjacent to each other in the row direction.

According to the present embodiment, in the target area, the first light source element and the second light source element disposed adjacent to the first light source element in one direction of the column direction and the row direction are sequentially PWM-driven at different timings.

In the present embodiment, the first light source element of the light source element group G1 and a third light source element of the light source element group G3 are arranged adjacent to each other in the other direction of the column direction and the row direction in the two-dimensional arrangement.

In the example in FIG. 7, the first light source element of the light source element group G1 is the light source element L11, and the third light source element of the light source element group G3 is the light source element L12. In FIG. 7, the light source elements L11 and L12 are adjacent to each other in the row direction, but may be adjacent to each other in the column direction.

According to the present embodiment, in the target area, the first light source element, the second light source element disposed adjacent to the first light source element in one direction of the column direction and the row direction, and the third light source element disposed adjacent to the first light source element in the other direction of the column direction and the row direction are sequentially PWM-driven at different timings.

In the present embodiment, the i-th light source element group Gi is coupled to an i-th column line group among the first column line group to the n-th column line group and an i-th row line group among the first row line group to the n-th row line group. The i-th light source driver DR1 drives the i-th light source element group Gi by controlling the i-th column line group and the i-th row line group.

In the example in FIGS. 8 to 11, the i-th column line group corresponds to a column line group transmitting a column signal CMi [3:0]. The i-th row line group corresponds to a row line group transmitting a row signal RWi [7:0]. As an example, in FIG. 8, the light source elements in the first row and the first column in each area belong to the first light source element group G1. These light source elements are coupled to the column line of the column signal CM1 [0] or CM1 [1] and the row line of the row signal RW1 [0] or RW1 [2]. The light source elements in the second row and the first column in each area belong to the second light source element group G2. These light source elements are coupled to the column line of the column signal CM2 [0] or CM2 [1] and the row line of the row signal RW2 [0] or RW2 [2].

According to the present embodiment, the i-th light source driver DR1 can drive the i-th light source element group Gi coupled to the i-th column line group and the i-th row line group by controlling the i-th column line group and the i-th row line group. Accordingly, the i-th light source driver DR1 can PWM-drive, among the light source element groups G1 to G4, the i-th light source element group Gi provided in the target area based on the dimming information for the target area.

In the present embodiment, the circuit device 100 performs color correction of the image data IMA based on the dimming information of the local dimming control, and outputs the color-corrected image data IMB to the display driver 230 of the display panel 220.

According to the present embodiment, the circuit device 100 performs the color correction in the local dimming, and the color-corrected image data is displayed on the display panel 220. In the backlight 210 subjected to the local dimming control, the light source element groups G1 to G4 in the target area are driven at different timings, thereby reducing flicker in the local dimming.

3. Second Embodiment

Figure 15:
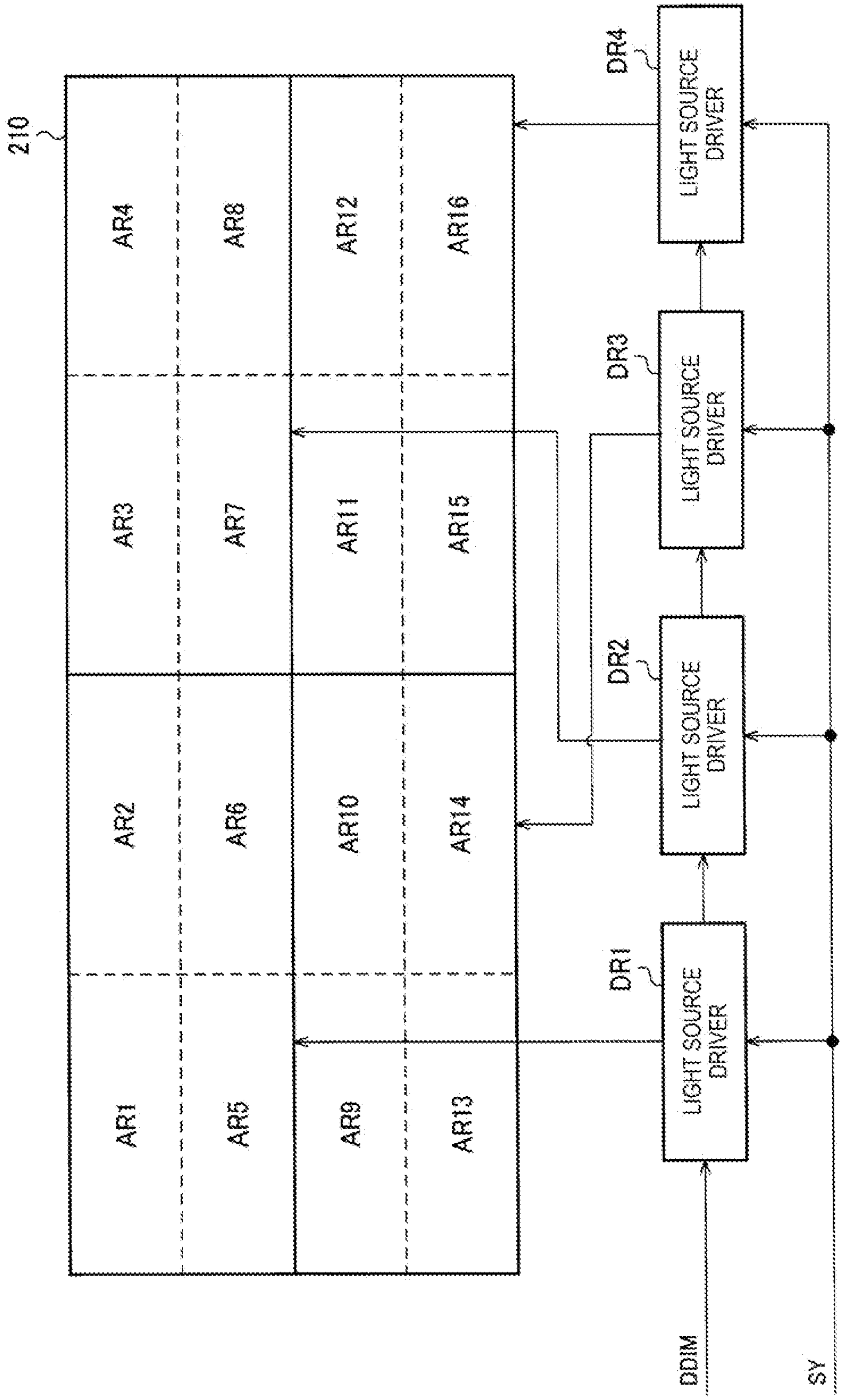
FIG. 15 is a diagram illustrating an area division of a backlight in a second embodiment.

Hereinafter, a second embodiment will be described, but description of portions similar to those of the first embodiment will be appropriately omitted. FIG. 15 is a diagram showing an area division of a backlight in the second embodiment. In the second embodiment, the light source driver DR1 drives the areas AR1, AR2, AR5, and AR6, the light source driver DR2 drives the areas AR3, AR4, AR7, and AR8, the light source driver DR3 drives the areas AR9, AR10, AR13, and AR14, and the light source driver DR4 drives the areas AR11, AR12, AR15, and AR16. A common synchronization signal SY is input to the light source drivers DR1 to DR4. The synchronization signal SY is a signal synchronized with the vertical synchronization signal VSYNC for image display, and has, for example, a pulse at a timing same as that of a pulse of the vertical synchronization signal VSYNC.

Figure 16:
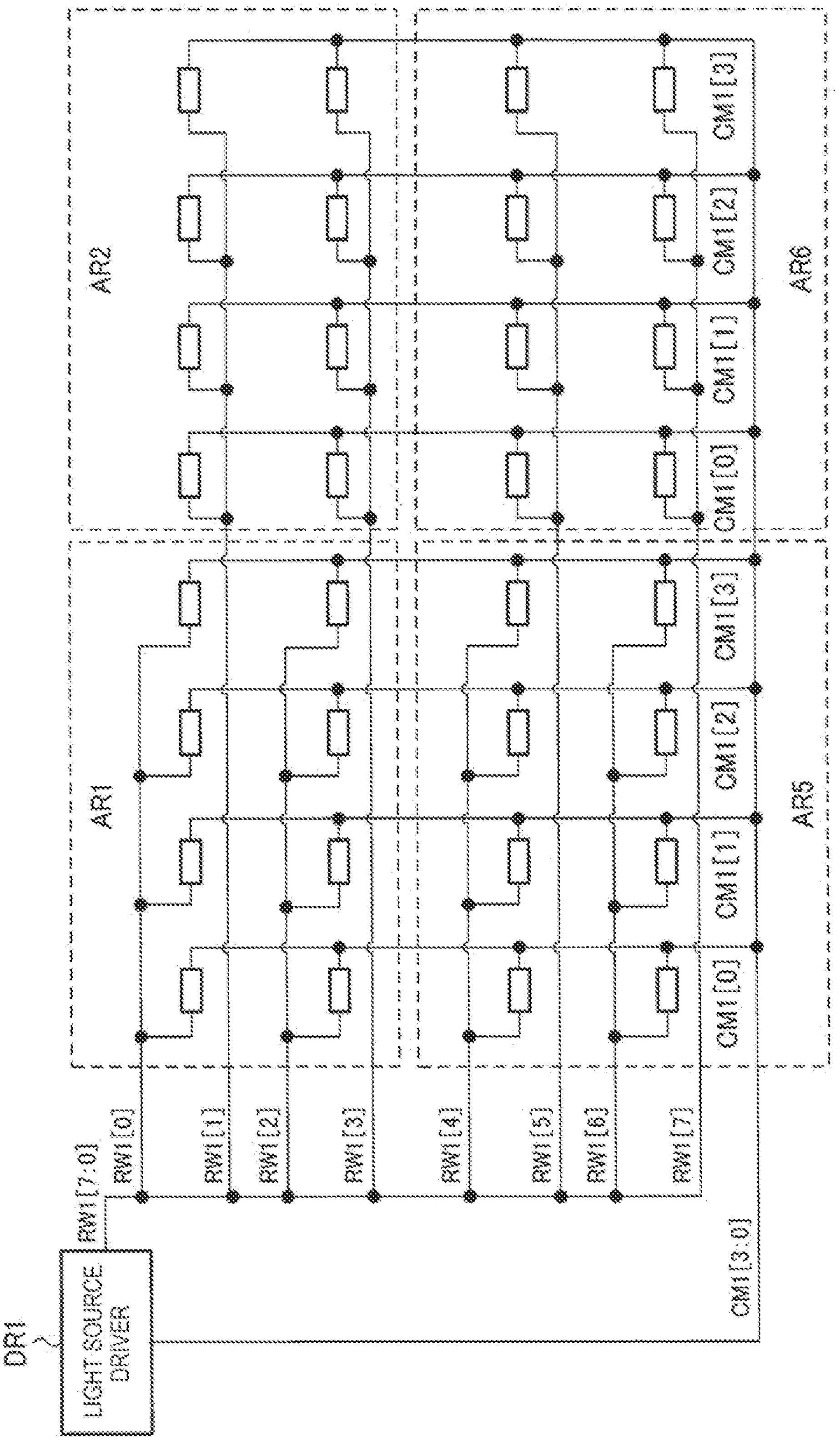
FIG. 16 shows an example of a connection between a light source driver and a light source element in the second embodiment.

FIG. 16 shows an example of connections between a light source driver and light source elements in the second embodiment. Here, an example of connections between the light source driver DR1 and the light source elements 10 in the areas AR1, AR2, AR5, and AR6 is shown, and the same connection is applied to other light source drivers. Here, an example in which 2×4 light source elements are arranged in a matrix in each area is shown, but a plurality of light source elements may be arranged in each area.

In each of the areas AR1, AR2, AR5, and AR6, the light source elements 10 in a first column are coupled to a first column line of a first column line group transmitting the column signal CM1 [0]. Similarly, the light source elements 10 in a second column, a third column, and a fourth column are respectively coupled to a second column line, a third column line, and a fourth column line of the first column line group transmitting the column signal CM1 [1], the column signal CM1 [2], and the column signal CM1 [3], respectively.

In the area AR1, the light source elements 10 in a first row are coupled to a first row line of a first row line group transmitting the row signal RW1 [0], and the light source elements 10 in a second row are coupled to a third row line of the first row line group transmitting the row signal RW1 [2]. Similarly, in the area AR2, the light source elements 10 in a first row and a second row are coupled to a second row line and a fourth row line of the first row line group transmitting the row signals RW1 [1] and RW1 [3], respectively. In the area AR5, the light source elements 10 in a first row and a second row are coupled to a fifth row line and a sixth row line of the first row line group transmitting row signals RW1 [4] and RW1 [6], respectively. In the area AR6, the light source elements 10 in a first row and a second row are coupled to a seventh row line and an eighth row line of the first row line group that transmits the row signals RW1 [5] and RW1 [7], respectively.

Figure 17:
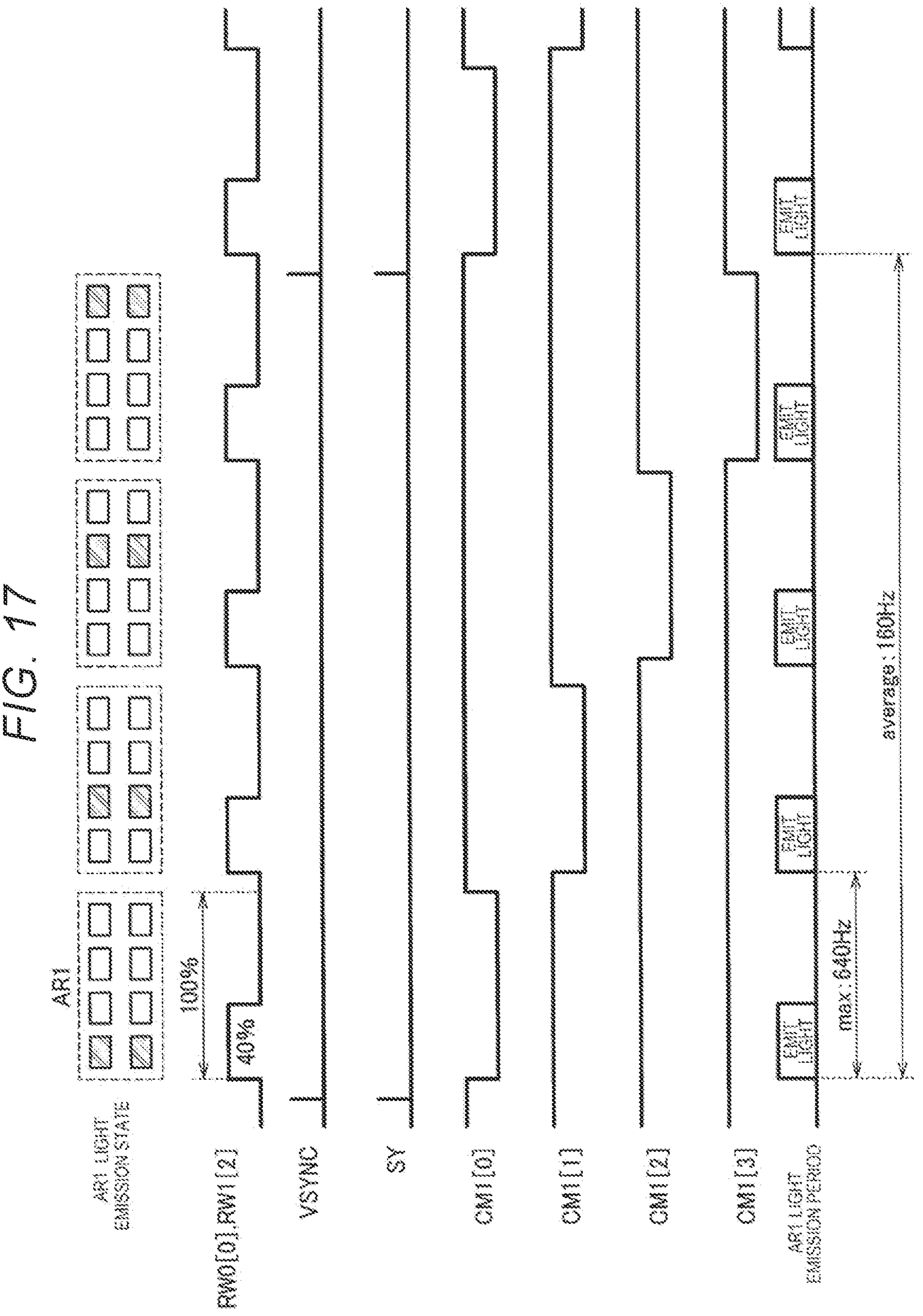
FIG. 17 shows an example of a signal waveform example in the second embodiment and an example of a light emission state in a connection state in FIG. 16.

FIG. 17 shows an example of a signal waveform in the second embodiment and an example of a light emission state in a connection state in FIG. 16. Here, an example in which the light source elements emit light with a luminance of 40% is shown, but the luminance of the light source elements in each area may be optional. Here, the area AR1 is described as an example, and the waveforms and light emission states of other areas are also determined according to the same rule according to the connection between the column lines and the light source elements.

In the area AR1, the light source elements 10 in a first column, a second column, a third column, and a fourth column are selected based on the column signals CM1 [0], CM1 [1], CM1 [2], and CM1 [3]. Therefore, as shown in an upper part of FIG. 17, in the area AR1, the light source elements 10 in a first row, a second row, a third row, and a fourth row emit light in this order. In the second embodiment, each column line of the first column line group coupled to the light source driver DR1 is coupled to one of the light source elements in the area AR1. For example, in FIG. 16, the number of columns of the light source elements in the area AR1 is the same as the number of lines of the first column line group, and one column line is coupled to one column. Accordingly, even when the synchronization signal SY is common to the light source drivers DR1 to DR4, any of the light source elements in the area is turned on in any of four PWM periods in one vertical scanning period.

In FIG. 17, a length of one period of the synchronization signal SY is the same as a length of the vertical scanning period, but the present disclosure is not limited thereto, and a length of a plurality of periods of the synchronization signals SY may be the same as the length of the vertical scanning period. When x is an integer of 2 or more and the length of the x period of the synchronization signals SY is the same as the length of the vertical scanning period, the light emission pattern is repeated x times in one vertical scanning period.

In the above embodiment, the display system 400 includes the circuit device 100 and the light source drivers DR1 to DR4. The circuit device 100 performs local dimming control of the display device 200 including the display panel 220 and the backlight 210. The light source drivers DR1 to DR4 drive the backlight 210 based on dimming information of the local dimming control. The i-th light source driver DR1 PWM-drives a first light source element group to a fourth light source element group provided in a target area based on dimming information for the target area at different timings. i is an integer of 1 or more and n=4 or less. The target area is an area to be driven by the i-th light source driver DR1 among the plurality of areas AR1 to AR16 of the backlight 210 in the local dimming control.

In the examples in FIGS. 15 and 16, the target area is any area among the areas AR1 to AR16. For example, the area AR1 is the target area. In the example in FIG. 16, the light source elements arranged in the first row in the area AR1 belong to the first light source element group. Similarly, two light source elements arranged in each of a second row, a third row, and a fourth row in the area AR1 belong to a second light source element group, a third light source element group, and a fourth light source element group, respectively. The light source driver DR1 PWM-drives the first light source element group to the fourth light source element group provided in the area AR1 based on the dimming information for the area AR1 at different timings.

The target area may include the first light source element group to a k-th light source element group. k is the number of column lines driven by one light source driver. In FIGS. 15 to 17, k=n=4, but it is not necessary that k=n, and k may be an integer of 2 or more.

According to the present embodiment, both a countermeasure against flicker of the backlight and local dimming in which the backlight emits light with independent brightness for each area can be achieved. Specifically, the i-th light source driver DR1 drives the first light source element group to the fourth light source element group in the target area at different timings, so that light emission timings of the respective light source element groups can be different from each other. Since the light emission timings of the light source element groups are different from each other, any of the light source elements in the area can be turned on in each PWM period. Accordingly, the apparent light emission frequency in the entire area can be improved, and thus the flicker can be reduced and the display quality of the display device including the backlight 210 can be improved.

In the present embodiment, the i-th light source driver DR1 starts driving a p-th light source element group at a p-th timing, and starts driving a (p+1)-th light source element group at a (p+1)-th timing after the p-th timing. p is an integer of 1 or more and k−1 or less.

In the example in FIG. 17, the drive start timing corresponds to a timing at which a column signal changes from a high level to a low level. When the light source driver DR1 changes a column signal CM1 [p] from a high level to a low level, the p-th light source element group to which light source elements in a p-th column in the area AR1 belong is driven. Thereafter, when the light source driver DR1 changes a column signal CM1 [p+1] from a high level to a low level, the (p+1)-th light source element group to which light source elements in a (p+1)-th column in the area AR1 belong is driven.

According to the present embodiment, the i-th light source driver DR1 drives the first light source element group to the fourth light source element group at a first timing to a fourth timing in a forward direction. Accordingly, the i-th light source driver DR1 can sequentially PWM-drive the first light source element group to the fourth light source element group at different timings in a period having a length same as that of one period of the scan driving performed by the light source driver.

The display system according to the present embodiment described above includes: a circuit device configured to perform local dimming control on a display device including a display panel and a backlight; and a first light source driver to an n-th light source driver configured to drive the backlight based on dimming information of the local dimming control. n is an integer of 2 or more. An i-th light source driver PWM-drives an i-th light source element group among the first light source element group to the n-th light source element group provided in a target area based on dimming information for the target area. i is an integer of 1 or more and n or less. The target area is an area to be driven by the first light source driver to the n-th light source driver among a plurality of areas of the backlight in the local dimming control.

According to the present embodiment, both a countermeasure against flicker of the backlight and local dimming in which the backlight emits light with independent brightness for each area can be achieved. Specifically, the first light source driver to the n-th light source driver drive the first light source element group to the n-th light source element group in the target area, respectively, so that the light emission timings of the respective light source element groups can be different from each other. The light emission timings of the respective light source element groups are different from each other, so that an apparent light emission frequency in the entire area can be improved, and thus the flicker can be reduced.

In the present embodiment, the first light source driver to the n-th light source driver may PWM-drive the first light source element group to the n-th light source element group provided in the target area at different timings.

According to the present embodiment, the first light source driver to the n-th light source driver can sequentially PWM-drive the first light source element group to the n-th light source element group at different timings. Accordingly, the light emission timings of the respective light source element groups are different from each other in the target area, and thus the flicker can be reduced.

In the present embodiment, a j-th light source driver among the first light source driver to the n-th light source driver may start driving a j-th light source element group among the first light source element group to the n-th light source element group at a j-th synchronization timing. j is an integer of 1 or more and n−1 or less. A (j+1)-th light source driver among the first light source driver to the n-th light source driver may start driving a (j+1)-th light source element group among the first light source element group to the n-th light source element group at a (j+1)-th synchronization timing after the j-th synchronization timing.

According to the present embodiment, the first light source driver to the n-th light source driver drive the first light source element group to the n-th light source element group at a first synchronization timing to an n-th synchronization timing in a forward direction. Accordingly, the first light source driver to the n-th light source driver can sequentially PWM-drive the first light source element group to the n-th light source element group at different timings in a period having a length same as that of one period of the scan driving performed by the light source driver.

In the present embodiment, the circuit device may output a first synchronization signal to an n-th synchronization signal to the first light source driver to the n-th light source driver. The first light source driver to the n-th light source driver may PWM-drive the first light source element group to the n-th light source element group at different timings based on the first synchronization signal to the n-th synchronization signal.

According to the present embodiment, a timing at which the first light source driver to the n-th light source driver drive the first light source element group to the n-th light source element group can be controlled by the circuit device outputting the first synchronization signal to the n-th synchronization signal. Accordingly, the circuit device can cause the first light source driver to the n-th light source driver to PWM-drive the first light source element group to the n-th light source element group at different timings.

In the present embodiment, the circuit device may output the first synchronization signal to the n-th synchronization signal whose timings are different from each other to the first light source driver to the n-th light source driver in synchronization with a vertical synchronization signal.

According to the present embodiment, in a vertical scanning period during which the light source driver performs the scan driving, the first light source driver to the n-th light source driver can sequentially PWM-drive the first light source element group to the n-th light source element group at different timings.

In the present embodiment, the light source elements belonging to the first light source element group to the n-th light source element group may be two-dimensionally arranged in plan view with respect to the backlight.

According to the present embodiment, by dividing the plurality of light source elements arranged two-dimensionally in the plan view with respect to the backlight into a plurality of areas, the local dimming control for independently controlling a light emission luminance of each area can be performed. By sequentially driving the light source elements belonging to the first light source element group to the n-th light source element group in each area at different timings, both local dimming and flicker reduction can be achieved.

In the present embodiment, a first light source element of the first light source element group and a second light source element of the second light source element group among the first light source element group to the n-th light source element group may be disposed adjacent to each other in one direction of a column direction and a row direction in the two-dimensional arrangement.

According to the present embodiment, in the target area, the first light source element and the second light source element disposed adjacent to the first light source element in the one direction of the column direction and the row direction are sequentially PWM-driven at different timings.

In the present embodiment, the first light source element of the first light source element group and a third light source element of the third light source element group among the first light source element group to the n-th light source element group may be disposed adjacent to each other in the other direction of the column direction and the row direction in the two-dimensional arrangement.

According to the present embodiment, in the target area, the first light source element, the second light source element disposed adjacent to the first light source element in the one direction of the column direction and the row direction, and the third light source element disposed adjacent to the first light source element in the other direction of the column direction and the row direction are sequentially PWM-driven at different timings.

In the present embodiment, an i-th light source element group may be coupled to an i-th column line group among a first column line group to an n-th column line group and to an i-th row line group among a first row line group to an n-th row line group. The i-th light source driver may drive the i-th light source element group by controlling the i-th column line group and the i-th row line group.

According to the present embodiment, the i-th light source driver can drive the i-th light source element group coupled to the i-th column line group and the i-th row line group by controlling the i-th column line group and the i-th row line group. Accordingly, the i-th light source driver can PWM-drive, among the first light source element group to the n-th light source element group, the i-th light source element group provided in the target area based on the dimming information for the target area.

In the present embodiment, the circuit device may perform color correction on the image data based on the dimming information of the local dimming control, and output the image data subjected to the color correction to the display driver of the display panel.

According to the present embodiment, the circuit device performs the color correction in the local dimming, and the color-corrected image data is displayed on the display panel. In the backlight subjected to the local dimming control, the first light source element group to the n-th light source element group in the target area are driven at different timings, thereby reducing flicker in the local dimming.

The display system according to the present embodiment includes: a circuit device configured to perform local dimming control on a display device including a display panel and a backlight; and a first light source driver to an n-th light source driver configured to drive the backlight based on dimming information of the local dimming control. n is an integer of 2 or more. The i-th light source driver among the first light source driver to the n-th light source driver PWM-drives the first light source element group to a k-th light source element group provided in a target area at different timings based on the dimming information for the target area. i is an integer of 1 or more and n or less. k is an integer of 2 or more. The target area is an area to be driven by the i-th light source driver among a plurality of areas of the backlight in the local dimming control.

According to the present embodiment, both a countermeasure against flicker of the backlight and local dimming in which the backlight emits light with independent brightness for each area can be achieved. Specifically, the i-th light source driver drives the first light source element group to the n-th light source element group in the target area at different timings, so that the light emission timings of the respective light source element groups can be different from each other. The light emission timings of the respective light source element groups are different from each other, so that an apparent light emission frequency in the entire area can be improved, and thus the flicker can be reduced.

In the present embodiment, the i-th light source driver may start driving a p-th light source element group among the first light source element group to the k-th light source element group at a p-th timing, and start driving a (p+1)-th light source element group among the first light source element group to the k-th light source element group at a (p+1)-th timing after the p-th timing. p is an integer of 1 or more and k−1 or less.

According to the present embodiment, the i-th light source driver drives the first light source element group to the k-th light source element group at a first timing to a k-th timing in a forward direction. Accordingly, the i-th light source driver can sequentially PWM-drive the first light source element group to the k-th light source element group at different timings.

The circuit device according to the present embodiment performs local dimming control on a display device including a display panel and a backlight. The circuit device includes: an image processing circuit configured to output display data to be displayed on the display panel; and a backlight control circuit configured to control a first light source driver to an n-th light source driver that drive the backlight. n is an integer of 2 or more. The backlight control circuit controls an i-th light source driver to PWM-drive an i-th light source element group among a first light source element group to an n-th light source element group provided in a target area based on dimming information of the local dimming control for the target area. i is an integer of 1 or more and n or less. The target area is an area to be driven by the first light source driver to the n-th light source driver among a plurality of areas of the backlight in the local dimming control.

The circuit device according to the present embodiment performs local dimming control on a display device including a display panel and a backlight. The circuit device includes: an image processing circuit configured to output display data to be displayed on the display panel; and a backlight control circuit configured to control a first light source driver to an n-th light source driver that drive the backlight. n is an integer of 2 or more. The backlight control circuit controls an i-th light source driver to PWM-drive a first light source element group to a k-th light source element group provided in a target area based on dimming information of the local dimming control for the target area at different timings. k is an integer of 2 or more. i is an integer of 1 or more and n or less. The target area is an area to be driven by the i-th light source driver among a plurality of areas of the backlight in the local dimming control.

Although the present embodiment has been described in detail above, it will be easily understood by those skilled in the art that many modifications can be made without substantially departing from the novel matters and effects of the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. All combinations of the present embodiment and the modifications are also in the scope of the present disclosure. Configurations, operations, and the like of the circuit device, the light source driver, the display system, the display device, the processing device, the electronic device, and the like are not limited to those described in the present embodiment, and various modifications can be made.

What is claimed is:

1. A display system comprising:

a circuit device configured to perform local dimming control on a display device including a display panel and a backlight; and a first light source driver to an n-th light source driver configured to drive the backlight based on dimming information of the local dimming control, n being an integer of 2 or more, wherein an i-th light source driver among the first light source driver to the n-th light source driver PWM-drives an i-th light source element group among a first light source element group to an n-th light source element group provided in a target area based on the dimming information for the target area, i being an integer of 1 or more and n or less, and the target area being an area to be driven by the first light source driver to the n-th light source driver among a plurality of areas of the backlight in the local dimming control, the i-th light source element group is coupled to an i-th column line group among a first column line group to an n-th column line group and to an i-th row line group among a first row line group to an n-th row line group, and the i-th light source driver drives the i-th light source element group by controlling the i-th column line group and the i-th row line group.

2. The display system according to claim 1, wherein the first light source driver to the n-th light source driver PWM-drive the first light source element group to the n-th light source element group provided in the target area at different timings.

3. The display system according to claim 2, wherein a j-th light source driver among the first light source driver to the n-th light source driver starts driving a j-th light source element group among the first light source element group to the n-th light source element group at a j-th synchronization timing, j being an integer of 1 or more and n−1 or less, and a (j+1)-th light source driver among the first light source driver to the n-th light source driver starts driving a (j+1)-th light source element group among the first light source element group to the n-th light source element groups at a (j+1)-th synchronization timing after the j-th synchronization timing.

4. The display system according to claim 2, wherein the circuit device outputs a first synchronization signal to an n-th synchronization signal to the first light source driver to the n-th light source driver, and the first light source driver to the n-th light source driver PWM-drive the first light source element group to the n-th light source element group at different timings based on the first synchronization signal to the n-th synchronization signal.

5. The display system according to claim 4, wherein the circuit device outputs the first synchronization signal to the n-th synchronization signal whose timings are different from each other to the first light source driver to the n-th light source driver in synchronization with a vertical synchronization signal.

6. The display system according to claim 1, wherein light source elements belonging to the first light source element group to the n-th light source element group are two-dimensionally arranged in plan view with respect to the backlight.

7. The display system according to claim 6, wherein a first light source element of the first light source element group and a second light source element of a second light source element group among the first light source element group to the n-th light source element group are arranged adjacent to each other in one direction of a column direction and a row direction in the two-dimensional arrangement.

8. The display system according to claim 7, wherein the first light source element of the first light source element group and a third light source element of a third light source element group among the first light source element group to the n-th light source element group are arranged adjacent to each other in the other direction of the column direction and the row direction in the two-dimensional arrangement.

9. The display system according to claim 1, wherein the circuit device performs a color correction on image data based on the dimming information of the local dimming control, and outputs the image data subjected to the color correction to a display driver of the display panel.

10. The display system according to claim 1, wherein the circuit device is further configured to:

determine, in an image area corresponding to the target area of the backlight, a maximum luminance of pixel data belonging to the image area;

determine a minimum backlight emission luminance within a range in which the maximum luminance is displayed on the display device; and set the minimum backlight emission luminance as a backlight emission luminance of the target area to perform the local dimming control based on the backlight emission luminance.

11. A display system comprising:

a circuit device configured to perform local dimming control on a display device including a display panel and a backlight; and a first light source driver to an n-th light source driver configured to drive the backlight based on dimming information of the local dimming control, n being an integer of 2 or more, wherein an i-th light source driver among the first light source driver to the n-th light source driver PWM-drives a first light source element group to a k-th light source element group provided in a target area at different timings based on the dimming information for the target area, i being an integer of 1 or more and n or less, k being an integer of 2 or more, and the target area being an area to be driven by the i-th light source driver among a plurality of areas of the backlight in the local dimming control, the k-th light source element group is coupled to an i-th column line group among a first column line group to an n-th column line group and to an i-th row line group among a first row line group to an n-th row line group, and the i-th light source driver drives the i-th light source element group by controlling the i-th column line group and the i-th row line group.

12. The display system according to claim 11, wherein the i-th light source driver starts driving a p-th light source element group among the first light source element group to the k-th light source element group at a p-th timing, and starts driving a (p+1)-th light source element group among the first light source element group to the k-th light source element group at a (p+1)-th timing after the p-th timing, p being an integer of 1 or more and k−1 or less.

13. A circuit device for performing local dimming control on a display device including a display panel and a backlight, the circuit device comprising:

an image processing circuit configured to output display data to be displayed on the display panel; and a backlight control circuit configured to control a first light source driver to an n-th light source driver that drive the backlight, n being an integer of 2 or more, wherein the backlight control circuit controls an i-th light source driver among the first light source driver to the n-th light source driver to PWM-drive an i-th light source element group among a first light source element group to an n-th light source element group provided in a target area based on dimming information of the local dimming control for the target area, i being an integer of 1 or more and n or less, the target area being an area to be driven by the first light source driver to the n-th light source driver among a plurality of areas of the backlight in the local dimming control, the i-th light source element group is coupled to an i-th column line group among a first column line group to an n-th column line group and to an i-th row line group among a first row line group to an n-th row line group, and the i-th light source driver drives the i-th light source element group by controlling the i-th column line group and the i-th row line group.

14. A circuit device for performing local dimming control on a display device including a display panel and a backlight, the circuit device comprising:

an image processing circuit configured to output display data to be displayed on the display panel; and a backlight control circuit configured to control a first light source driver to an n-th light source driver that drive the backlight, n being an integer of 2 or more, wherein the backlight control circuit controls an i-th light source driver among the first light source driver to the n-th light source driver to PWM-drive a first light source element group to a k-th light source element group provided in a target area at different timings based on dimming information of the local dimming control for the target area, i being an integer of 1 or more and n or less, k being an integer of 2 or more, and the target area being an area to be driven by the i-th light source driver among a plurality of areas of the backlight in the local dimming control, the k-th light source element group is coupled to an i-th column line group among a first column line group to an n-th column line group and to an i-th row line group among a first row line group to an n-th row line group, and the i-th light source driver drives the i-th light source element group by controlling the i-th column line group and the i-th row line group.

* * * * *